United States Patent [19]
Shoji et al.

[11] Patent Number: 5,974,469
[45] Date of Patent: *Oct. 26, 1999

[54] SYSTEM FOR MANAGING COMMUNICATION BETWEEN PROGRAM MODULES

[75] Inventors: Wataru Shoji; Daisuke Tabuchi; Ichiro Nakajima, all of Tokyo, Japan

[73] Assignee: Sofmap Future Design, Inc., Tokyo, Japan

[*] Notice: This patent is subject to a terminal disclaimer.

[21] Appl. No.: 08/679,202

[22] Filed: Jul. 12, 1996

[51] Int. Cl.[6] ...................................................... G06F 9/44
[52] U.S. Cl. ............................................................ 709/303
[58] Field of Search ................................... 395/680, 683, 395/200.47; 709/300, 303

[56] References Cited

U.S. PATENT DOCUMENTS

| | | | |
|---|---|---|---|
| 5,473,777 | 12/1995 | Moeller et al. | 395/682 |
| 5,491,822 | 2/1996 | Allen et al. | 395/683 |
| 5,519,875 | 5/1996 | Yokoyama et al. | 395/800 |
| 5,732,261 | 3/1998 | Savitzky et al. | 707/103 |

FOREIGN PATENT DOCUMENTS

| | | | |
|---|---|---|---|
| 0 121 015 A1 | 10/1984 | European Pat. Off. | G09G 1/16 |
| 0 513 553 A2 | 11/1992 | European Pat. Off. | G06F 9/44 |
| 0 592 091 A2 | 4/1994 | European Pat. Off. | G06F 9/46 |
| 0 592 091 A3 | 4/1994 | European Pat. Off. | G06F 9/46 |
| WO 94/28480 | 12/1994 | WIPO | G06F 3/14 |

OTHER PUBLICATIONS (no author given), "Object Request Broker Architecture", OMG TC Document 93.7.2., pp. 1–38, Jul. 1993.

"The Touring Machine System"; Communication of the ACM; vol. 36, No. 1, Jan. 1993, pp. 68–77.

Schilit, B. N., et al.; "TeleWeb: Loosely Connected Access to the World Wide Web"; Computer Networks and ISDN Systems; vol. 28, No. 11, May 1996; pp. 1431–1444.

Nachbar, D.; "When Network File Systems Aren't Enough: Automatic Software Distribution Revisited"; Usenix Summer conference Proceedings, Jun. 9, 1986; pp. 159–171.

Hiroyuki Tarumi, et al.; "Canae—A User Interface Construction Environment With Editors as Software Parts"; NEC Research and Development; No. 98, Jul. 1990; pp. 89–97.

Dingle A. et al.; "Web Cache Coherence", Computer Networks and ISDN Systems; vol. 28 No. 11, May 1996; pp. 907–920.

*Primary Examiner*—Alvin E. Oberley
*Assistant Examiner*—St. John Courtenay, III
*Attorney, Agent, or Firm*—H. C. Chan

[57] ABSTRACT

A specialized communication controller class is used to manage communications in an object oriented programming system. Classes in the system are not designed to communicate directly with each other, and communication between classes is routed by this controller class. As a result, there is no need for each class to keep track of any hierarchical relationship of classes in an application in order to be able to communicate with other classes. Members of the object oriented programming system contain parameter files and can send commands to the controller class. The controller class executes the commands without return result to the senders. Similarly, the controller class can send commands to other class members, and these commands are executed without returning result to the controller class.

12 Claims, 18 Drawing Sheets

SYSTEM FOR MANAGING COMMUNICATION BETWEEN PROGRAM MODULES

BACKGROUND OF THE INVENTION

When digital computers were first available, the amount of memory in a computer was very small. Consequently, the size of a computer program was also very small. The challenge of writing a good computer program was to squeeze as much functions as possible in the available memory, i.e., the code to implement each function should be as small as possible. As the amount of memory increases, there is no need to place a premium on reducing the size of computer programs. Instead, the challenge becomes developing methods to write large applications efficiently and free of bugs. It is found that making software "modular" goes a long way in meeting this challenge. This is because it is much easier to write many small programs (and integrate them in an appropriate manner) than to write one large program. This approach can be used by both the traditional procedural-oriented programming environment and the recent object-oriented programming environment.

In modular programming, a complex system is decomposed into several subsystems. Each subsystem is associated with a program module. The subsystem could itself be decomposed into lower level subsystems (which are associated with lower level program modules). Ideally, these program modules are independent modules that can communicate with other program modules. As a result, programming can be performed by a team of programmers, with each programmer taking care of a small number of program modules. Consequently, modular programming encourages team work. Further, it is comparatively easy to debug and maintain each program modules. This is because defective or unsatisfactory program modules could be isolated and modified while the rest of the system is either not affected or minimally affected.

In order to combine program modules into a large application, the modules must be able to communicate with each other. An important factor for using modular programming successfully is that communication between program modules are handled efficiently. If the communication is cumbersome, the modules would use much computer resource for communication (instead of performing useful work) and the programmers would spend much time in writing codes to handle program communication.

SUMMARY OF THE INVENTION

The present invention involves a novel method of communication between programming classes. This method uses a specialized communication controller class to manage communications. Classes are not designed to communicate directly with each other, and all communication between classes is designed to be routed by this controller class. As a result, there is no need for each class to keep track of any hierarchical relationship of these classes in an application in order to be able to communicate with other classes.

The above described classes (including the controller class) can be grouped together to form a program module (called program "cells"). The cells can then be grouped together to form an application. The above method can be used to allow the cells to communicate with each other. Specifically, a specialized communication controller cell is used to control and manage communication between cells. Cells are not designed to communicate directly with each other, and all communication must be routed by the controller cell. This method can be extended further to manage (i) communication between different applications and (ii) communication between program modules in different computers in a data network.

These and other features and advantages can be understood from the following detailed description of the invention together with the accompanying drawings.

DETAILED DESCRIPTION OF THE INVENTION

Figure 1:
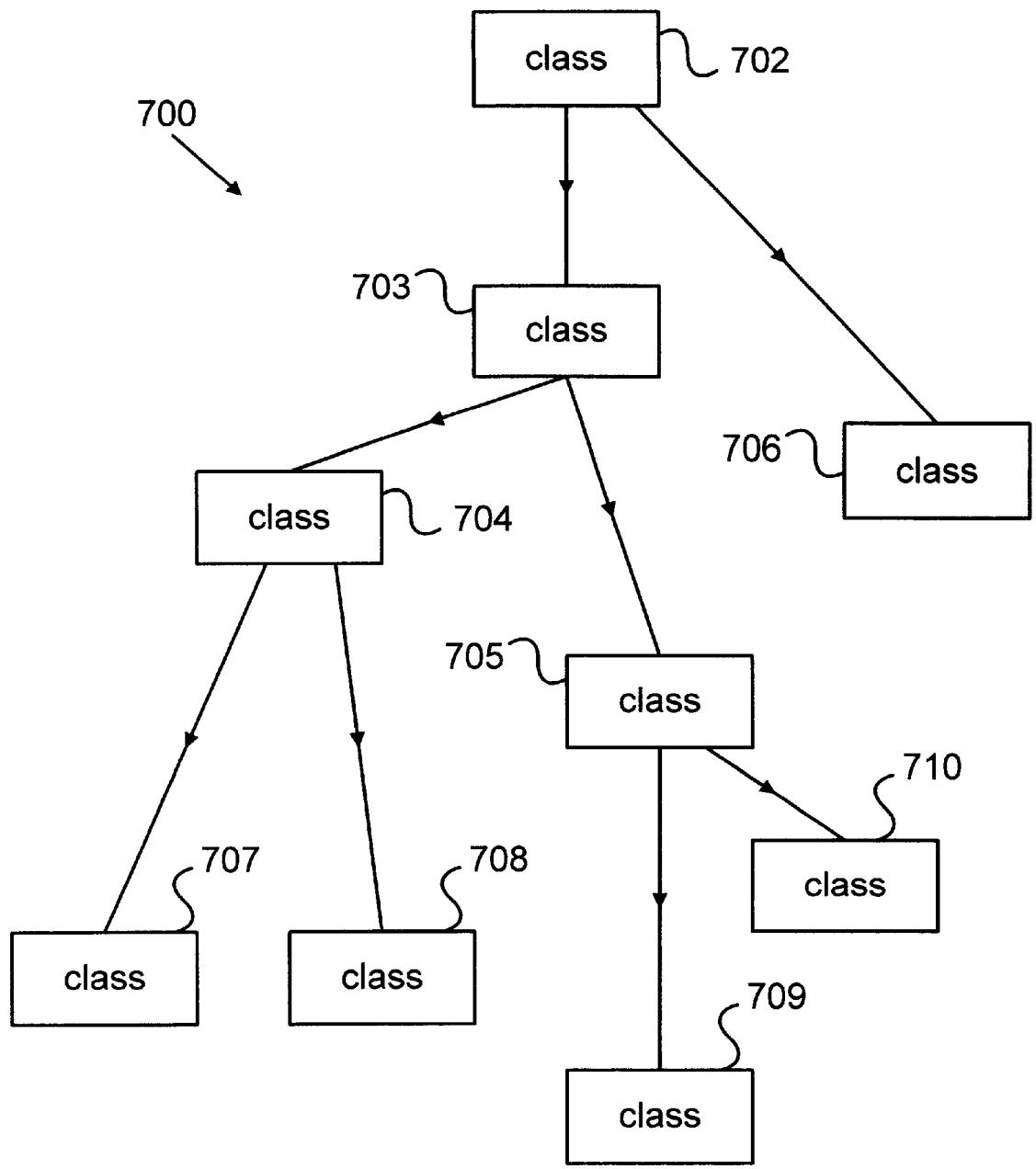
FIG. 1 is a schematic diagram of a programming structure designed using prior art classes.

FIG. 1 is a schematic diagram of a prior art object oriented programming ("OOP") structure 700. It comprises a plurality of classes, shown in FIG. 1 as classes 702–710. These classes are arranged in a hierarchical structure. Communication between classes in structure 700 follows a hierarchical path. For example, class 707 (which is at the end of a branch in structure 700) can communicate directly with classes in its branch, but cannot communicate directly with classes in other branches (e.g., class 709 at the end of another branch). Thus, if class 707 wishes to communicate with class 709, the message has to pass through class 703, which is common to both classes 707 and 709. Similarly, if class 707 wishes to communicate with class 706, the message has to pass through class 702, which is common to both 707 and 706.

The above described communication method works fine for simple applications. If the complexity of an application increases, it is sometimes difficult to keep track of various branches and communication paths. Further, it is very difficult to upgrade the application. This is because a change in the hierarchical location of one class could affect the program code of all classes which need to communicate with this class.

Figure 2:
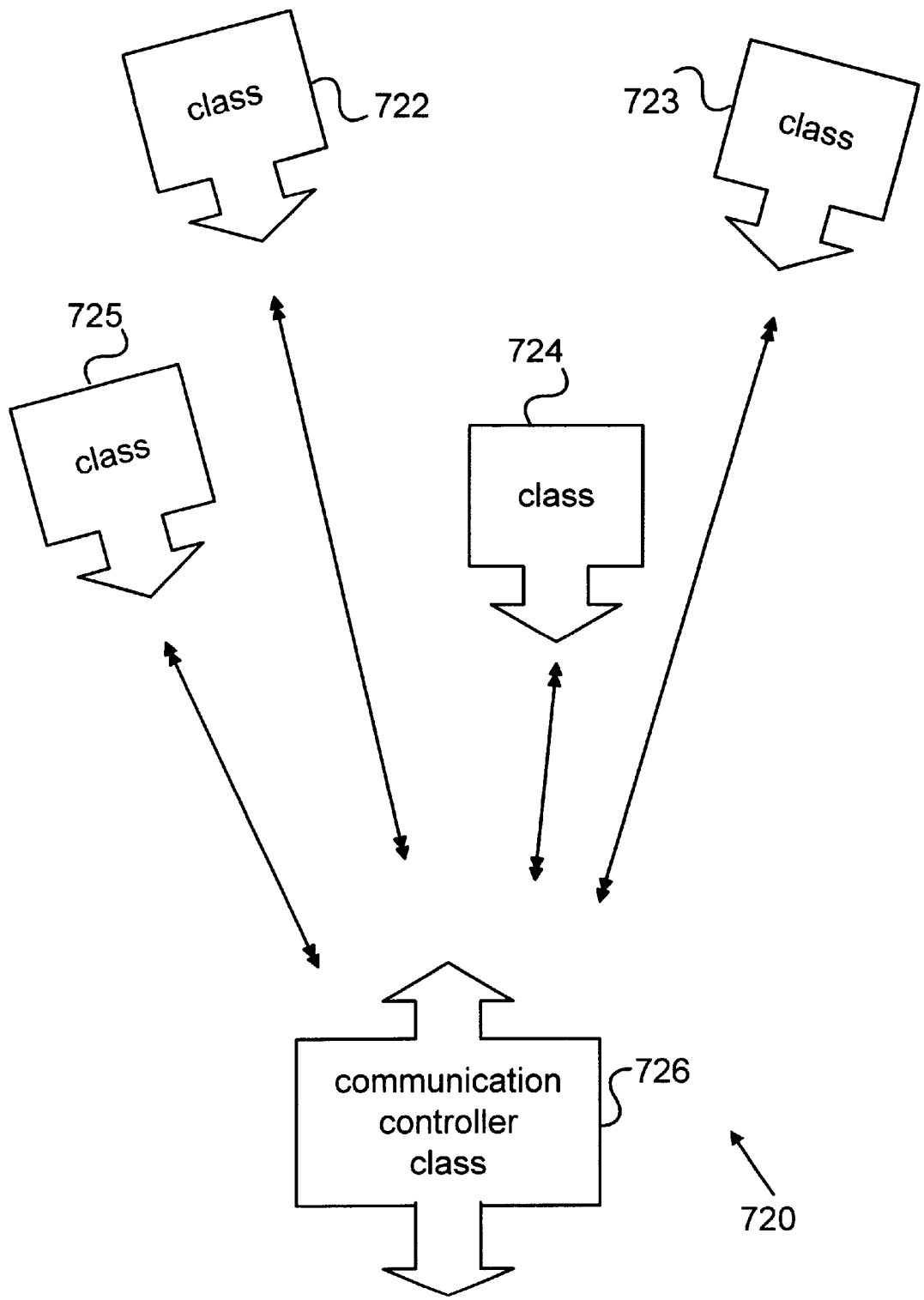
FIG. 2 is a schematic diagram of a programming structure of the present invention.

FIG. 2 is a schematic diagram of a programming structure 720 of the present invention. Structure 720 comprises a plurality of classes, shown in FIG. 2 as classes 722–726. Classes 722–725 are essentially regular classes with a requirement that they are designed to communicate with only one class: class 726. Class 726 is a specialized class designed to manage communication between classes 722–725 inside structure 720. In a further embodiment of the present invention, class 726 also controls communication between classes 722–725 and program modules outside of structure 720 (e.g., other applications). Thus, class 726 can be considered a communication controller class, and is referred herein as controller 726.

In structure 720, classes 722–725 are not designed to communicate with each other directly. They are designed to communicate with controller 726. For example, if class 722 wishes to send a message to class 723, it first sends the message to controller 726. The message contains (i) an instruction to a destination class (e.g., class 723), and optionally (ii) the name or address of the destination class. Note that it is possible to identify the destination class based on the instruction if the instruction is unique to a class. In this case, controller 726 contains a list of instructions and their associated classes. When controller 726 receives a message without any designation, it can determine the destination of the message by looking up the list. The instruction can be forwarded to the correct destination class. The above described protocol of communicating via a controller class is called herein as the "local digital shifting function (local DSF)" protocol.

The classes in structure 720 can be activated at different times. Thus, controller 726 needs to keep track of which class is active at any given time. As part of the activation process, a class registers itself in controller 726 by sending a message thereto. Thus, controller 726 can reserve resources for this class. When a class is deactivated, it should also send a message to controller 726 so that controller 726 can release the reserved resource for other classes. Consequently, controller 726 knows which classes are active and are able to send and receive messages.

In another embodiment of the present invention, communication between classes 722–725 and controller 726 does not require any acknowledgment message (or a return value). For example, when class 722 sends a message to controller 726, controller 726 is not obliged to return any value or message to class 722. Similarly, when controller 726 delivers the message originated from class 722 to class 723, class 723 is not obliged to return any value or message to controller 726. This aspect of the present invention allows communication to be carried out with the least amount of overhead and delay.

In a further embodiment of the present invention, the messages between classes 722–725 and controller 726 are ASCII coded. That is, the name of the instruction and other optional information (e.g, identify of the destination class) are coded in ASCII format.

Figure 3:
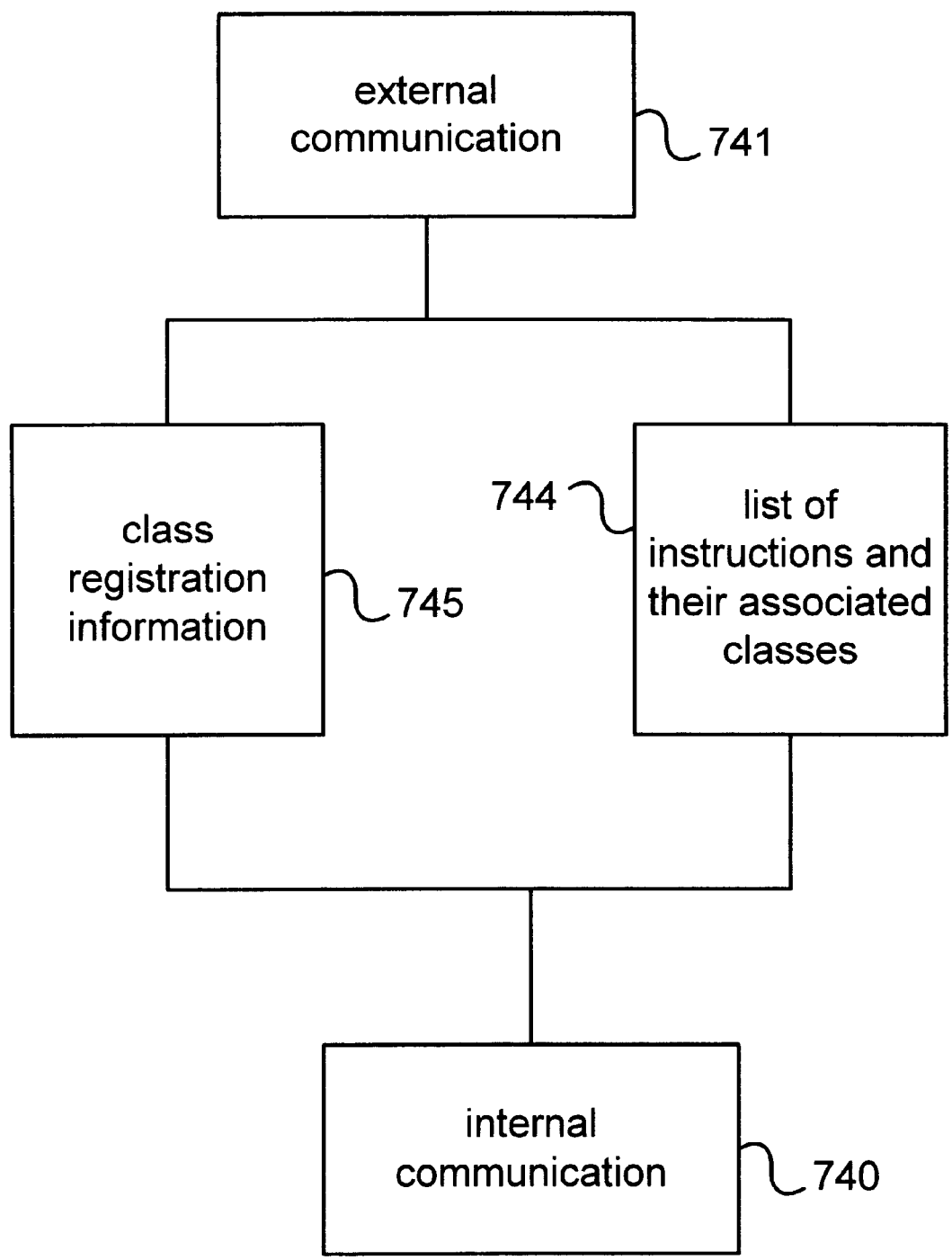
FIG. 3 shows the structure of communication controller class of the present invention.

FIG. 3 shows the structure of controller 726. It contains a block of program code 740 for receiving, processing and sending local DSF protocol and a block of program code 741 for receiving, processing, and sending instructions external to structure 720. Blocks 740 and 741 can communicate with two storage regions: (i) a region 744 containing a list of instructions and their associated classes, and (ii) a region 745 containing information of classes that have been activated. Information in regions 744 is used to match instruction with destination classes, as explained above. As an example, when block 740 receives a message from class 722–725 that does not indicate a destination class (or from other programming structures external to structure 729), block 740 examines the list in region 744 to determine the destination of the instruction. If no destination is found, the message can be ignored. Information in region 745 is provided to controller 726 by other classes in structure 720 when a class is activated. The activating class registers with and supplies registration information to controller 726. The information allows controller 726 to manage messages more efficiently.

In the present invention, controller 726 is a specialized program module. The only function it performs is to control the communication of messages. Thus, controller 726 could be written in an efficient manner (e.g., the program size is very small and speed of execution very fast).

The operation of structure 720 is now described. An example is used to illustrate the operation: displaying the result of arithmetic operation of two numbers. It is assumed that (i) class 722 is a dialogue box class for users to enter numbers, (ii) class 723 is a arithmetics class for performing arithmetical operations on numbers, and (iii) class 724 is a display class for displaying information, including the result of the computation by arithmetics class 723. In the present invention, there is no need to know the hierarchical structure of these classes. All communication is one-to-one between these three classes and controller 726.

As part of the activation process, classes 722–724 register with controller 726. The function of dialogue box class 722 is to accept inputs from users (entered via a mouse or a keyboard). When a valid input (e.g., a number) is entered, dialogue box class 722 takes the input and encodes it in the local DSF protocol for transmission to arithmetics class 723 via controller 726. Arithmetics class 723 calculates the sum when the two numbers and the "add" operation have been received. The result of the computation is sent by arithmetics class 723 to display class 724 via controller 726. When display class 724 receives the result, it displays the result in a window.

As can be seen from the above described operation, there is no need for any class to know the hierarchical structure of the application. All communication is directed to a single controller. For example, arithmetics class 723 could be a branch of a mathematic class which contains classes for performing arithmetics, integration, logic operations, etc. Under prior art communication method, dialogue box class 722 needs to know the hierarchic structure relating to arithmetics class 723. There is no need to do so in the present invention. The improved architecture reduces programming complexity. It allows program codes to be developed and maintained in a more efficient manner. Even though there is overhead involved in adding a communication controller class and requiring communication be routed by that class, the overhead (in terms of program size and speed) is minimal because controller 726 is designed to perform limited number of operations.

Extension of the Architecture

The above described architecture can be extended easily. In this case, structure 720 is only one program module in a multi-module application. Each module could be a program "cell" as described in a section entitled "Detailed Description of the Digital Cell Technology". The cells are part of a new programming technology called digital cell technology (DCT). Detailed description of the cells and the method for using these cells to form applications are described in the section entitled "Detailed Description of the Digital Cell Technology". Each cell has a communication controller which manages communication (i) between the classes inside a cell and (ii) between other cells and classes inside a cell. Thus, classes inside a cell are not designed to communicate directly with other cells.

Figure 4:
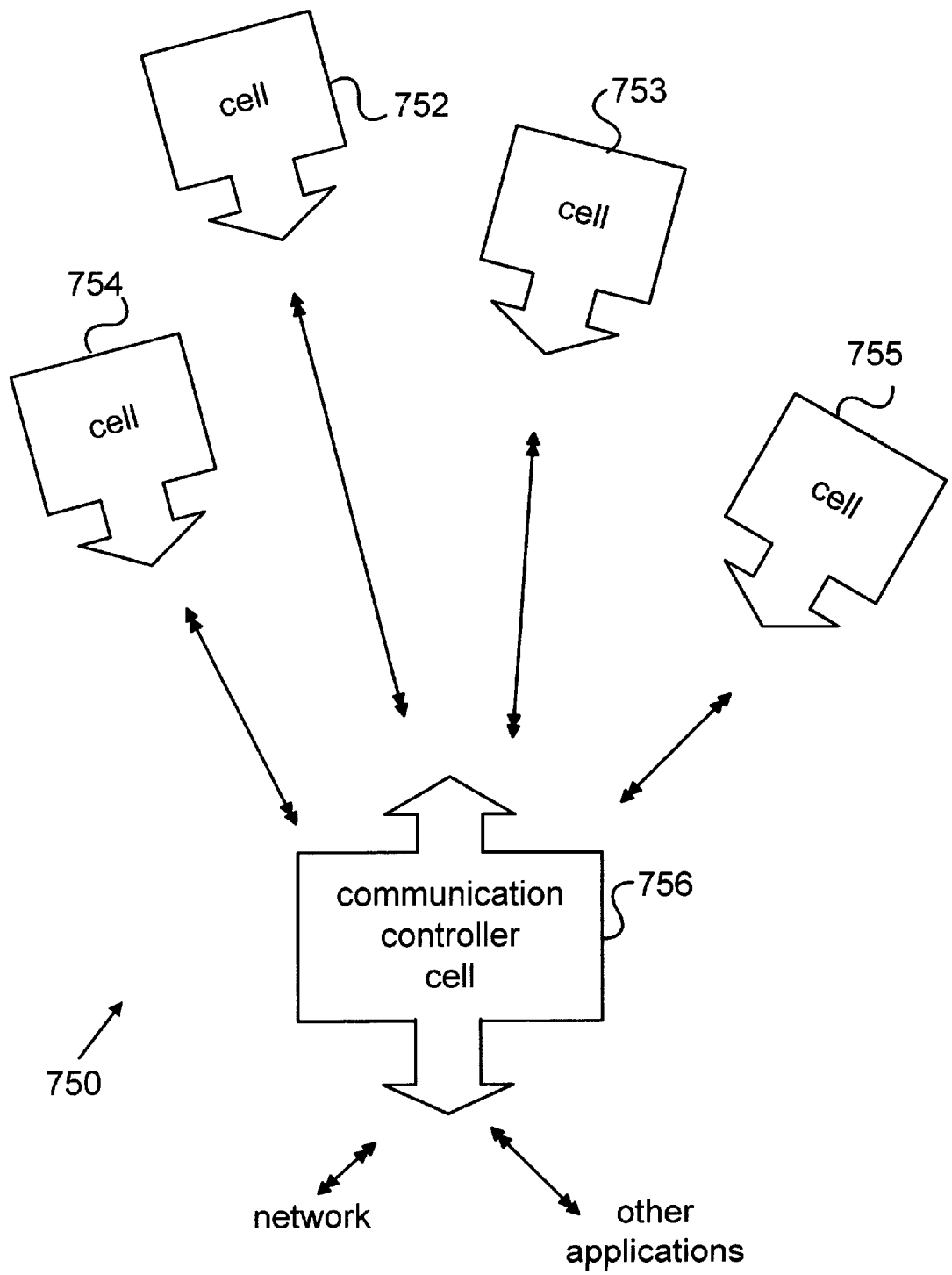
FIG. 4 is a schematic diagram of an extension of the structure shown in FIG. 2.

FIG. 4 shows an embodiment in which a plurality of cells 752–755 are grouped together to form an application 750 (or a portion of an application). Each cell is similar to structure 720 of FIG. 2. Thus, each cell has a communication controller class (not shown in FIG. 4) which manages communication to and from the cell. Application 750 also comprises a communication controller cell 756. The role of this cell is similar to the role of communication controller class 726 of FIG. 2. Each cell is designed to communicate only with a communication controller cell 756. The communication protocol and method of operation of application 750 is similar to that of structure 720. Application 750 can communicate with other applications and data networks (such as the Internet) via communication controller cell 756.

In the arrangement of FIG. 4, the classes in a cell can optionally be made available to other cells. In this case, a first cell (e.g., cell 752) can issue an instruction to a second cell (e.g., cell 753) via controller cell 756. The controller class of the first cell then directs the instruction to an appropriate class inside the first cell. Note that a cell can hide some or all of its classes from other cells. This arrangement allows some or all of the classes in a cell to be shared by other cells.

The architecture shown in FIGS. 2 and 4 can be extended upward to any levels. The number of components (e.g., classes in FIG. 2 and cells in FIG. 4) in each level and the number of levels depend on the complexity of the desired application. One advantage of the present invention is that the complexity of communication increases only slowly with the number of components and levels. On the other hand, the complexity of communication in prior art systems increases drastically with the number and level of classes.

Figure 5:
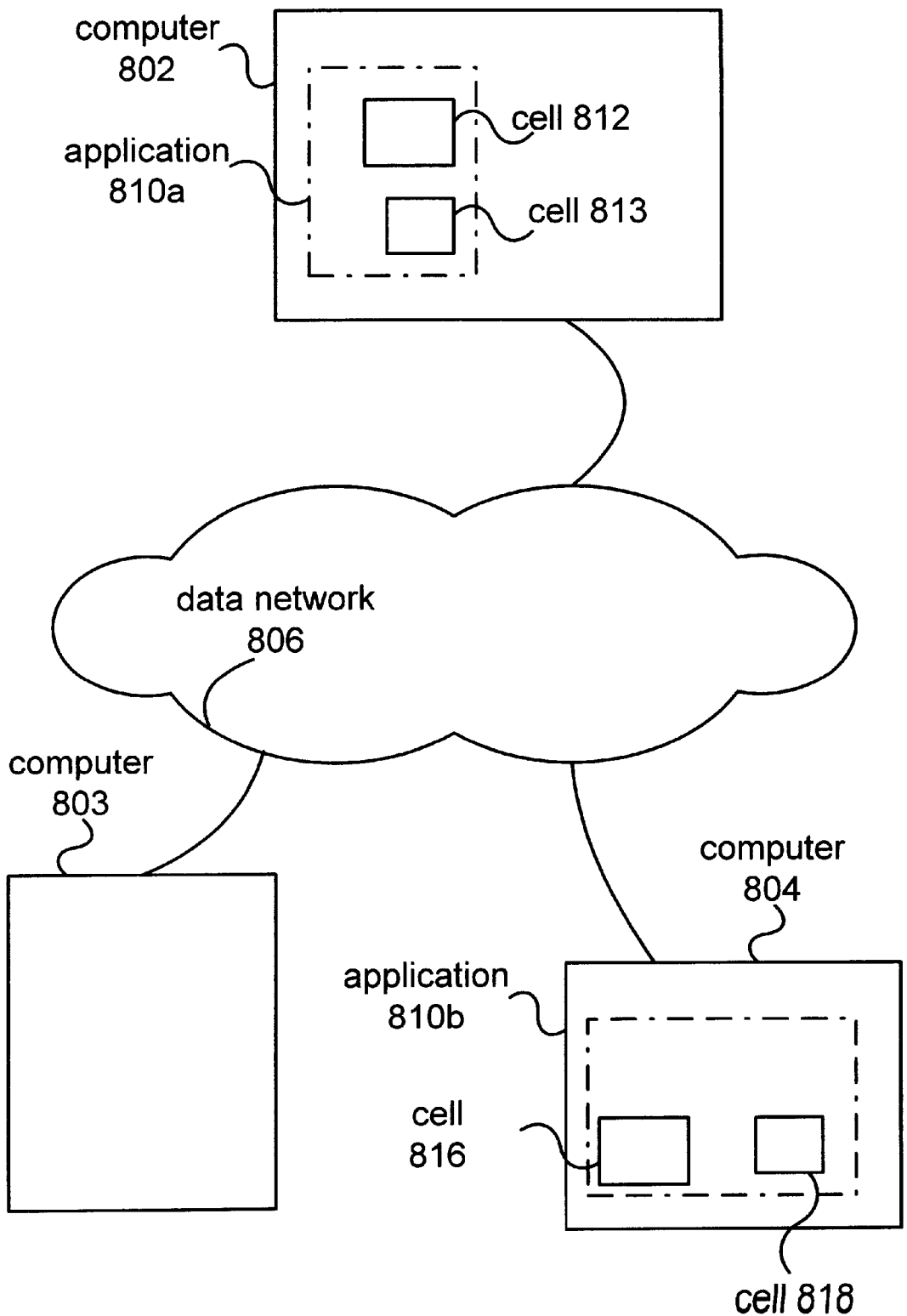
FIG. 5 is a schematic diagram of an multi-computer application designed using the programming structure of the present invention.

An example of designing an multi-computer application using the above described system is described below. FIG. 5 shows a plurality of computers 802–804 connected to a data network 806. These computers can execute applications having similar structure as application 750 of FIG. 4 and are designed using programming structure 720 of FIG. 2. As an example, two computers, such as computers 802 and 804, execute an application comprising a portion 810a in computer 802 and a portion 810b in computer 804. Portion 810a comprises one or more cells, such as cells 812 and 813. One of these cells, such as cell 812, is a controller cell. Portion 810b may also comprises one or more cells, such as cells 816 and 818. One of these cells, such as cell 816, is a controller cell. When portion 810a needs to use cell 818 in computer 804, controller cell 812 sends a command, via data network 806, to controller cell 816. Controller cell 816 then delivers the command to cell 818.

It should be noted that the cell-to-cell communication protocol described here is slightly different from the cell-to-cell communication protocol described in the section entitled "Detailed Description of the Digital Cell Technology" (called therein as "DSF"). The present protocol for communication between a cell and the communication controller cell could be called the "DSF-2" protocol.

The invention has been described with reference to a specific exemplary embodiment thereof. Various modification and changes may be made thereunto without departing from the broad spirit and scope of the invention. The specification and drawings are, accordingly, to be regarded in an illustrative rather than a restrictive sense; the invention is limited only by the provided claims.

DETAILED DESCRIPTION OF THE DIGITAL CELL TECHNOLOGY

Figure 6:
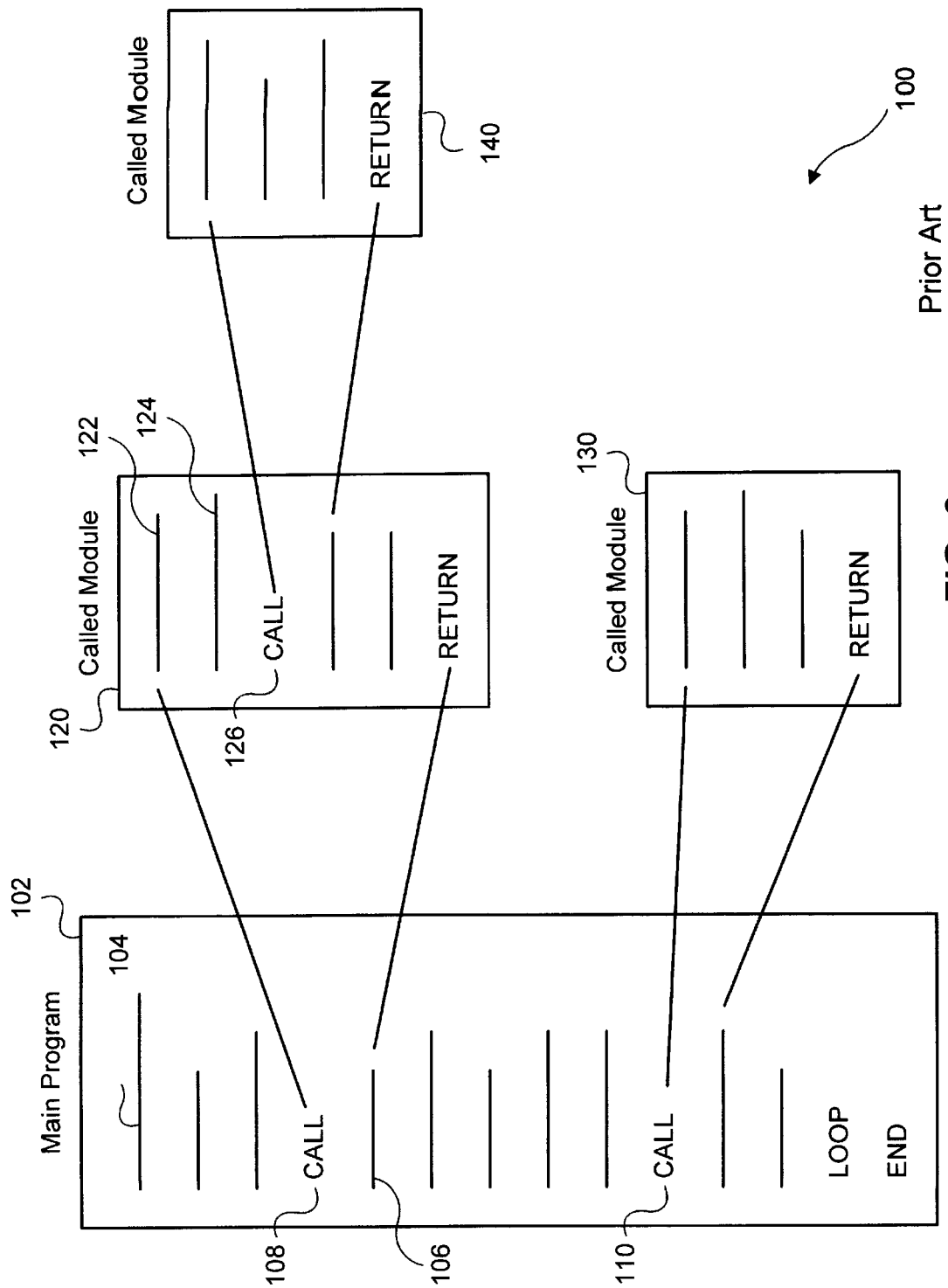
FIG. 6 is a diagram showing a prior art programming architecture.

Conventional computer program architecture consists of a main program and a plurality of program modules. The main program typically controls and coordinates the operation of the program modules. FIG. 6 is a schematic diagram of a program 100 having such an architecture. In FIG. 6, a main program 102 contains a plurality of statements, such as 104 and 106. Some of the statements could be CALL statements, such as statements 108 and 110. These two CALL statements, when executed, will invoke program modules 120 and 130. Main program 102 may contain a LOOP statement which causes main program 102 to execute continuously in a loop. Main program 102 also contains a STOP statement for terminating the program. It should be appreciated that program 100 could be written in different programming languages, and the precise syntax of the statements and program structure could vary with the programming languages.

Program 100 contains a plurality of program modules, such as modules 120 and 130, called by main program 102. Module 120 contains a plurality of statements, such as statements 122 and 124. It could also contain a plurality of CALL statements, such as statement 126. This statement, when executed, will invoke another module 140. Finally, module 120 contains a RETURN statement.

When CALL statement 108 is executed, main program 102 jumps to module 120. Statements 122, 124 and the rest of the program are executed. Upon executing the RETURN statement in module 120, program 100 returns to statement 106, which is the statement following CALL statement 108. At this time, the control of program 100 is returned to main program 102. Main program 102 continues to execute.

The structure of all the modules is similar to that of module 120. Similarly, the jump-return mechanism, described above, is carried out by all the CALL statements in program 100. Consequently, they will not be further described in this specification.

In order to carry out this jump-return mechanism, the return addresses of the CALL statements need to be saved in RAM (typically in a memory structure called a stack). Other essential state information of the computer prior to jumping to the called module, such as values of registers, may also be saved if there is a need to do so (e.g., when jumping to an interrupt service routine). Thus, when main program 102 calls module 120, the contents of these registers may also be pushed (i.e., saved) in the stack. Similarly, when module 120 calls module 140, the return address of module 120 also needs to be saved. The contents of appropriate registers may need to be pushed in the stack. Thus, the size of the stack could be large when a large number of CALL statements are executed.

When a RETURN statement is executed, the return address is used to return to the calling program. The saved information is also retrieved.

Typically, a program in the above described conventional architecture contains many CALL statements and many modules. These modules could call other modules (e.g., module 120 can call module 140), thereby forming a chain of CALL statements. The precise history of this chain needs to be preserved so that the last called module can return to the main program. One of the problems of the conventional architecture is that the time to travel the chain could be very long. As pointed out above, each time a CALL statement is invoked, certain amount of state information needs to be saved, resulting in overhead in execution. Each time a RETURN statement is executed, the saved information needs to be restored, again requiring overhead in execution. As a result, the execution speed of programs written using conventional architecture is slow.

The following are some of the characteristics of the conventional architecture: (a) there is a controlling ("boss") program, e.g., main program 102, (b) all the linkage information (e.g., return address and registers) needs to be preserved when one part of the program (a calling program such as main program 102 or some of the modules) transfers execution to another (the called program), and (c) the linkage information is used to return control and information to the calling program. This architecture could be called a "boss" architecture. The calling module can be considered a master while the called module can be considered a slave executing commands issued by the master and then reporting results to the master.

Recently, other programming architectures have been developed. However, they are also based on the boss architecture. One example is object-oriented programming. This method allows codes to be reused and applications developed relatively rapidly. However, the applications still have a controlling body which adds tremendous overhead.

Advances in program architecture have also been made in operating environments. One example is an interprocess communication protocol called dynamic data exchange (DDE) used in Microsoft's MS Windows environment. DDE uses a shared memory to exchange data between processes and a protocol to synchronize the passing of data. The heart of DDE protocol is the DDE message. A process (client) can ask another process (server) to perform a service. Specifically, the client issues a WM_DDE_EXECUTE message to post a command to the server by storing a command string in a global memory block and passing to the server a handle to the global memory block. The server subsequently returns a WM_DDE_ACK message to the client. If the server successfully executes the command, the WM_DDE_ACK message would return a TRUE value to a DDEACK structure member labelled "fAck." If the command is not successfully executed, the server posts a WM_DDE_ACK message with "fAck" set to FALSE. When the client receives the WM_DDE_ACK message from the server, it deletes the command string from global memory and proceeds to take appropriate actions accordingly.

It is clear that interprocess communication via DDE has many characteristics of the conventional architecture shown in FIG. 6. Specifically, the preservation of linkage information and the return of control to the client are important aspects of DDE. While the architecture of FIG. 6 stores the content of a few registers and the return address in each interprocess communication, DDE uses elaborate commands and data structure. As a result, DDE is even less efficient than the architecture of FIG. 6.

Another example of new developments in operating environment is an architecture used in MS Windows called OLE (Object Linking and Embedding). This architecture allows one application (e.g., a word processor program) to be linked to one or more applications (e.g., a spreadsheet program). In the terminology of OLE, applications can be classified as client applications and server applications. MS Windows uses a "registration database" to maintain a collection of information about OLE applications and file extensions for MS Windows applications. All communication between applications is handled by OLE. Specifically, OLE applications communicate through the use of three dynamic-link libraries: OLECLI.DLL, OLESRV.DLL, and SHELL.DLL. The SHELL.DLL enables applications to communicate with the registration database. The OLECLI.DLL is the OLE client library and the OLESRV.DLL is the server library. The OLE server and client libraries communicate with each other through DDE messages. The typical path of communication for an OLE function includes the call of the function, DDE messages between OLE libraries, and disseminating information to the client and server applications.

In one example, when the OLESRV.DLL library receives notification from the OLECLI.DLL library that a client application needs an object, the OLESRV.DLL library calls appropriate server methods. For example, OLESRV.DLL calls a ServerOpen( ) method when a user activates an object in an OLE client application. The server application then performs the operation of the ServerOpen( ) method. If ServerOpen( ) is performed successfully, the method returns OLE_OK. If ServerOpen( ) is not performed successfully, an OLE_ERROR_OPEN is returned. The client application can then take appropriate actions.

The registration database in OLE contains the linkage or history of the applications. The registration database and the client-server structure of OLE form a boss architecture. Further, even a simple communication between applications requires the involvement of many Windows components (e.g., DDE, dynamic-link libraries, etc.). It is well-known that MS Windows applications require a lot of memory and processor bandwidth. The boss architecture together with the complicated structure of MS Windows' components could be one reason for the slow performance.

Figure 7A:
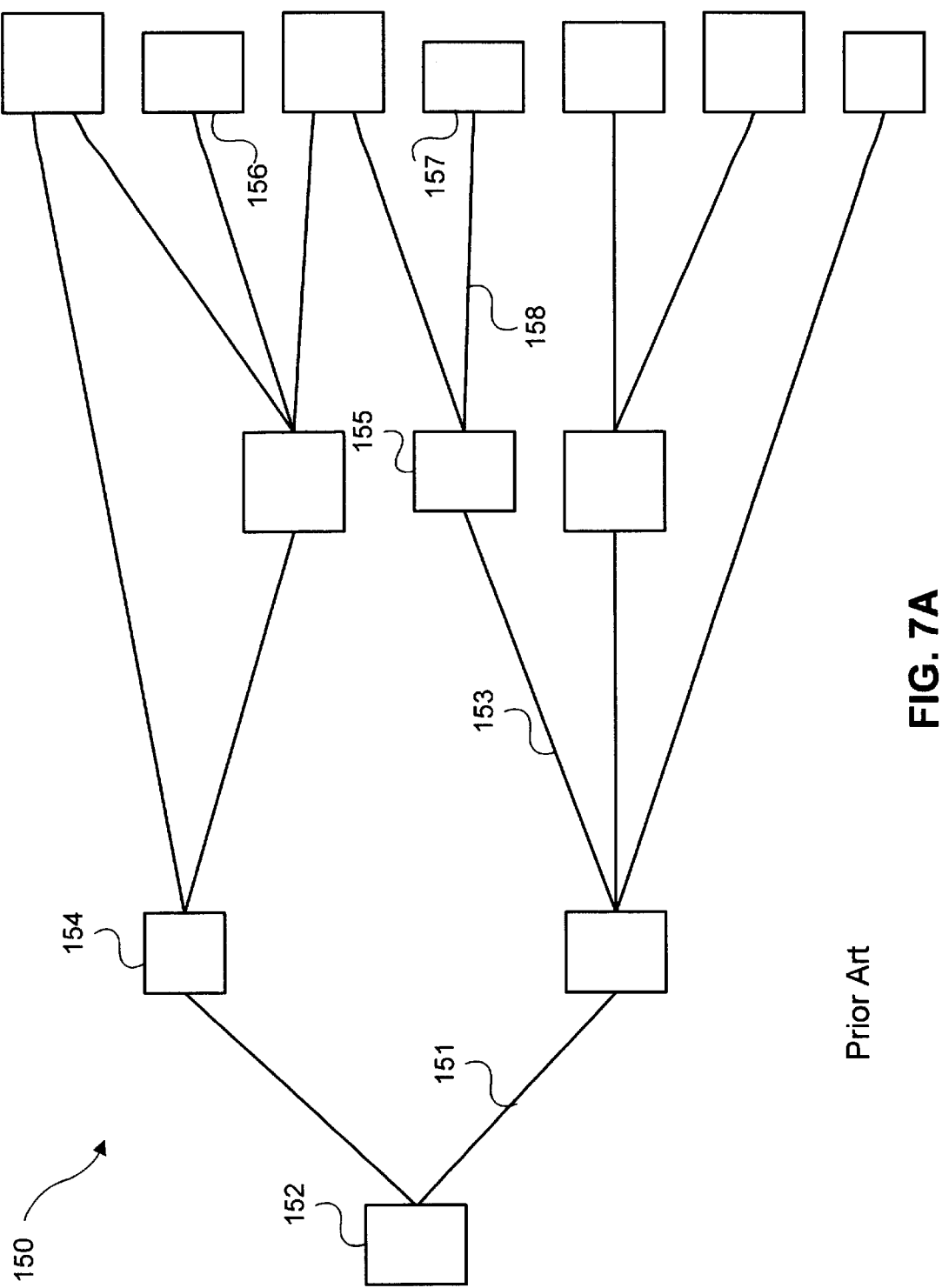
FIGS. 7A and 7B show a comparison between prior art architecture and the architecture of the present invention.
Figure 7B:
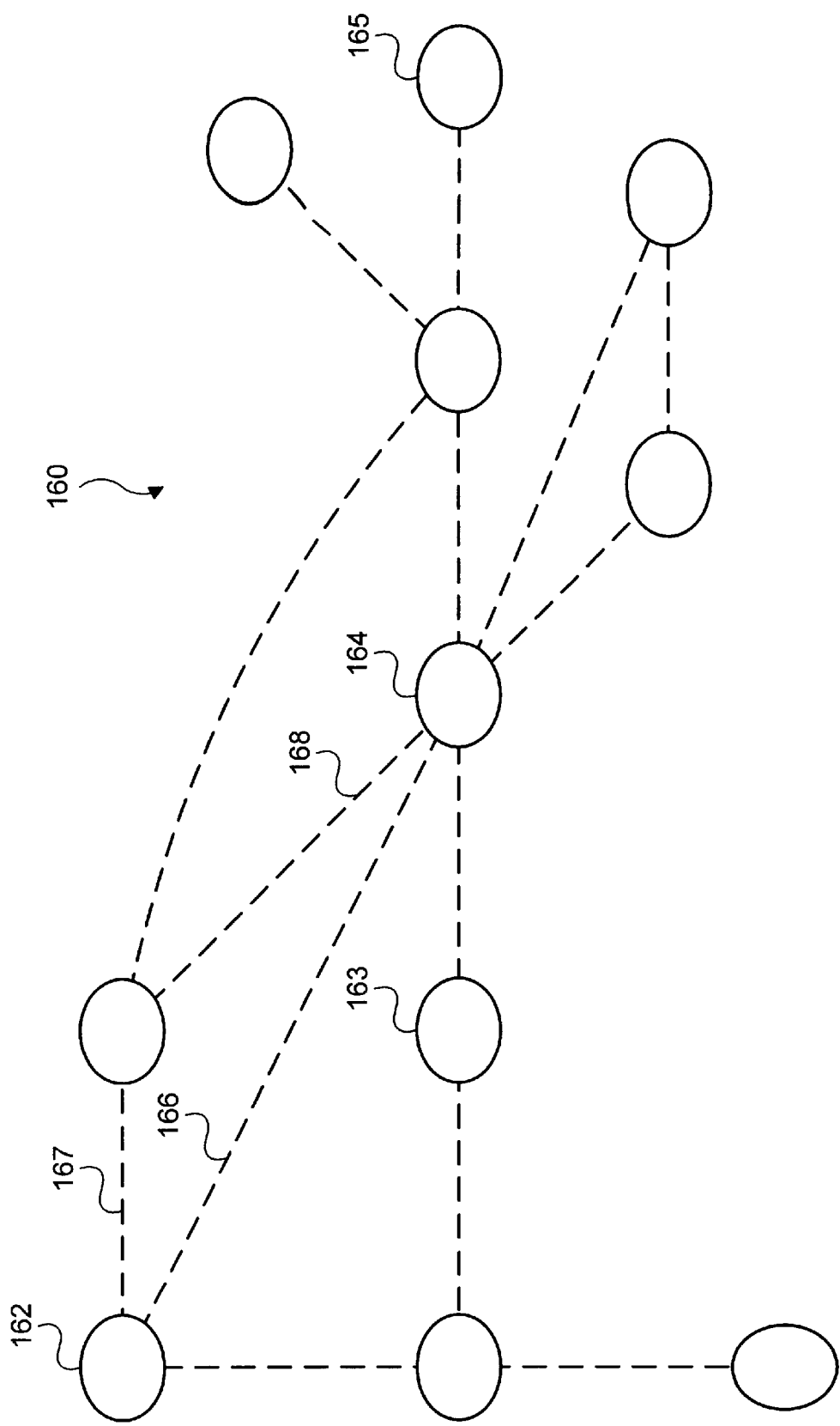

The architecture of the present system is called a "bossless" architecture because every program module is on equal footing with other program modules. There is no module that controls the overall operation of the program (i.e., no boss). A comparison of the bossless architecture and the boss architecture is shown in FIGS. 7A and 7B. FIG. 7A is a schematic view of an application 150 based on the boss architecture. The architecture is in the form of a hierarchic structure, and a boss module 152 controls a plurality of modules, such as modules 154–157. Solid lines running from the boss to the individual modules are used to graphically depict the chains of command and linkage. When a program module in the lowest level (i.e., module 157 at the end of a branch) is executing, solid lines (i.e., links) 151, 153 and 158 from the boss to that program module must be maintained. FIG. 7B is a schematic view of an application 160 based on the present bossless architecture. Application 160 comprises a plurality of program modules, such as modules 162–165. Each program module (called a "cell" in the present architecture) is the same as the other cells in an hierarchical sense. Cells are linked together in a novel way in which no history or linkage information needs to be retained. Each link is independent. For example, there is no need for links to be active simultaneously. Each link is direct, i.e., two cells can be linked directly without the need of using one or more intermediate links. For example, cells 162 and 164 can be linked directly using line 166 instead of using lines 167 and 168 and passing through an intermediate cell. An application can be formed by defining the cells involved and using the novel link of the present architecture. This is different from the situation in FIG. 7A where the link from the boss to the module at the lowest level must be active at all time while the module is executing. In FIG. 7B, dashed lines are used to graphically depict the novel interaction of the present architecture.

Figure 8:
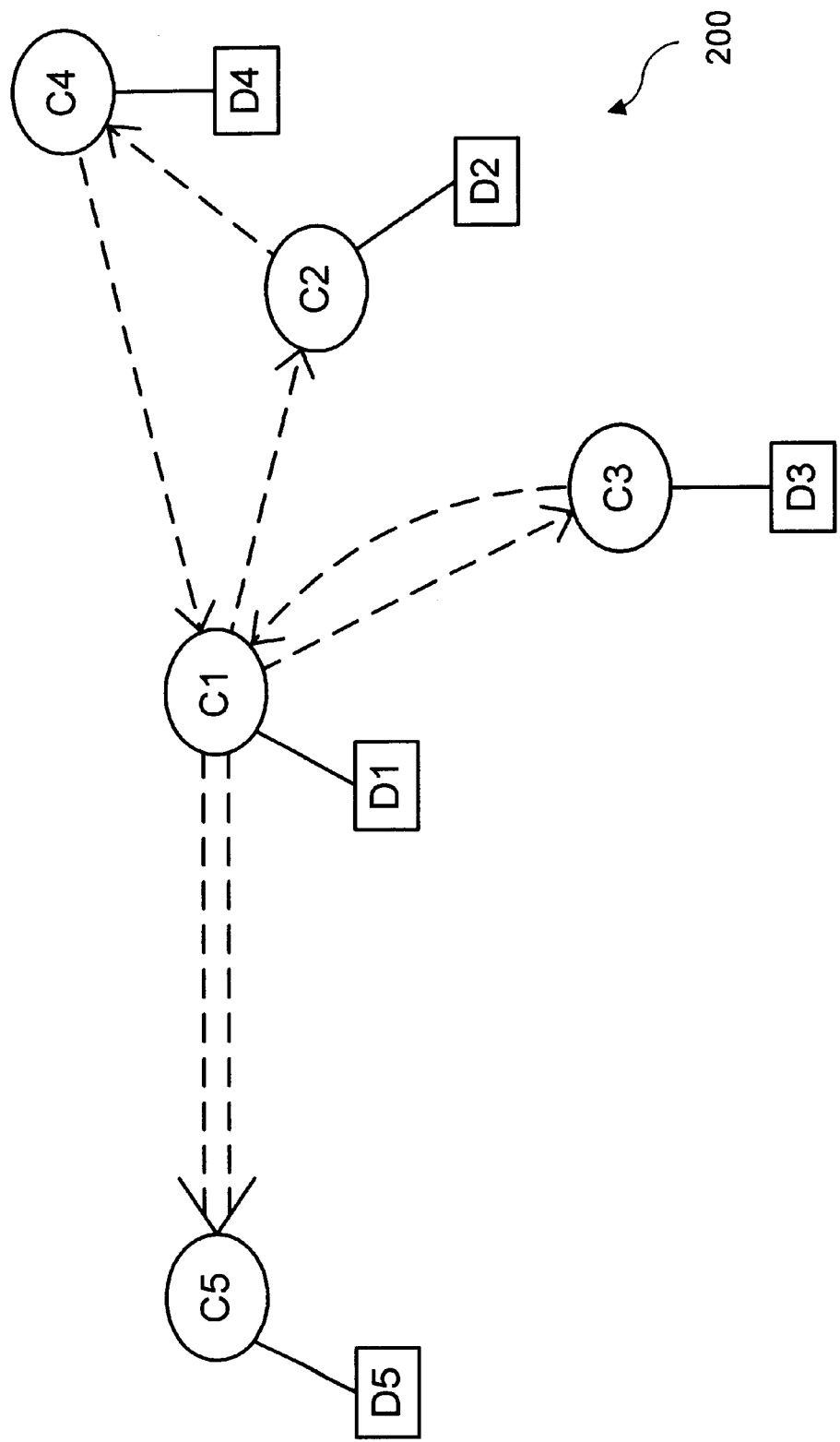
FIG. 8 is a diagram showing the interaction of cells in accordance with the present invention.

FIG. 8 is a drawing showing the structure of an application 200 using the bossless architecture of the present architecture. Application 200 contains a plurality of cells, labeled as C1–C4, loaded and executing in RAM. Each cell has an associated file (labeled as D1–D4), called DNA file, which contains information of the cell. The term "DNA" is used here in analogy with the biological relationship between a living cell and its DNA. At a desired time, cell C1 can send statements (called "DSF statements") to cell C2 using a protocol called digital shifting function ("DSF") protocol. Cell C2 will execute these statements. The detail structures of cells, DNA files and the DSF protocol will be described below.

One important distinction of the present architecture from conventional inter-process communication is that cell C2 does not retain information on the origin of these statements, i.e., no history of the inter-process communication is kept. Thus, once cell C1 completes its writing of DSF statements to cell C2, there is no further linkage between cells C1 and C2. Cell C2 does not know the origin of these statements during their execution. It is possible for cell C1 to later establish communication with cell C2 again by sending another set of statements to C2. However, this communication is separate from the previous communication, and terminates once the new set of DSF statements is sent.

Each of the cells can send DSF statements to any of the cells it desires. Thus, cell C1 can also send statements to cell C3. Similarly, cell C2 can send statements to cell C4, which in turn can send statements to cell C1. Cell C3 can also send statements to cell C1.

In this example, cells C1 and C2 are not bosses to C4. For example, when C4 is executing DSF statements, there is no need to maintain any links between cells C1 and C2 and between cells C2 and C4. Cell C4 has no obligation to report results of execution to any cells in application 200. Links are maintained only during the time DSF statements are transferred. Further, the writing of statements by cell C1 to cell C2 could be independent of the writing of statements by cell C2 to cell C4. In addition, cell C4 merely execute statements, and does not care where the statements come from. In FIG. 8, dashed lines are used to graphically depict the novel relationship between cells.

As pointed out above, one of the problems of the conventional architecture is that excessive amount of linkage information is retained, thereby slowing down the execution of programs. In the present architecture, there is no need to save and restore register values on a stack when cell C2 executes statements written by cell C1. There is no need to register cells in a central database prior to sending commands. There is no need to send messages back and forth to report status of execution. As a result, the application can be executed quickly.

Because there is practically no overhead in linking programs, it is possible to design an application using a large number of small cells. In a preferred embodiment, the size of the cells are small, e.g., typically about 10 kilobytes. The function of each cell is well defined and focus there is flexibility in designing applications and the efficiency in execution improves.

A cell can also invoke another cell (e.g., cell C1 can invoke cell C5, as indicated by the double dashed line), if that cell is not already loaded and running in RAM. The invoked cell (i.e., cell C5) could be completely independent of the invoking cell (i.e., cell C1) after invocation. Thus, the invoking cell is not the boss of the invoked cell and the two cells are hierarchically at the same level. This is completely different from the prior art in which an invoking program module is at a hierarchical different level as the invoked program module.

As explained below, a cell can be implemented as an "EXE" file (in the MS DOS or MS Windows environment), and can be loaded into RAM for execution using well known methods in accordance with the operating environment. The cell's associated DNA file can also be loaded into RAM. The invoked cell takes on the attributes stored in its DNA cell. It is also possible to modify the DNA file when the cell is invoked or while running by writing to the file (which could be an ASCII file). As a result, the architecture provide a flexible approach to build applications.

It can be seen from FIG. 8 that the bossless architecture has a flat structure instead of a hierarchical architecture of FIGS. 6 and 7A. Each of the cells C1–C4 is an independent executable routine which is at the same hierarchical level as other executable routines. No cell functions as a boss for other cells. Consequently, this architecture is called a bossless architecture.

This architecture allows an application to start at any cell. Other cells can be invoked as needed. This architecture also allows an application to end at any cell. Because there is no chain to unwind, the cells can terminate immediately. There is no need to return to the "boss" program before exiting the application. In one embodiment of the present architecture, a cell can exit the application at a predetermined time after invocation of a new cell. In another embodiment of the present architecture, other cells can send a DSF statement to this cell requesting it to terminate.

Figure 9:
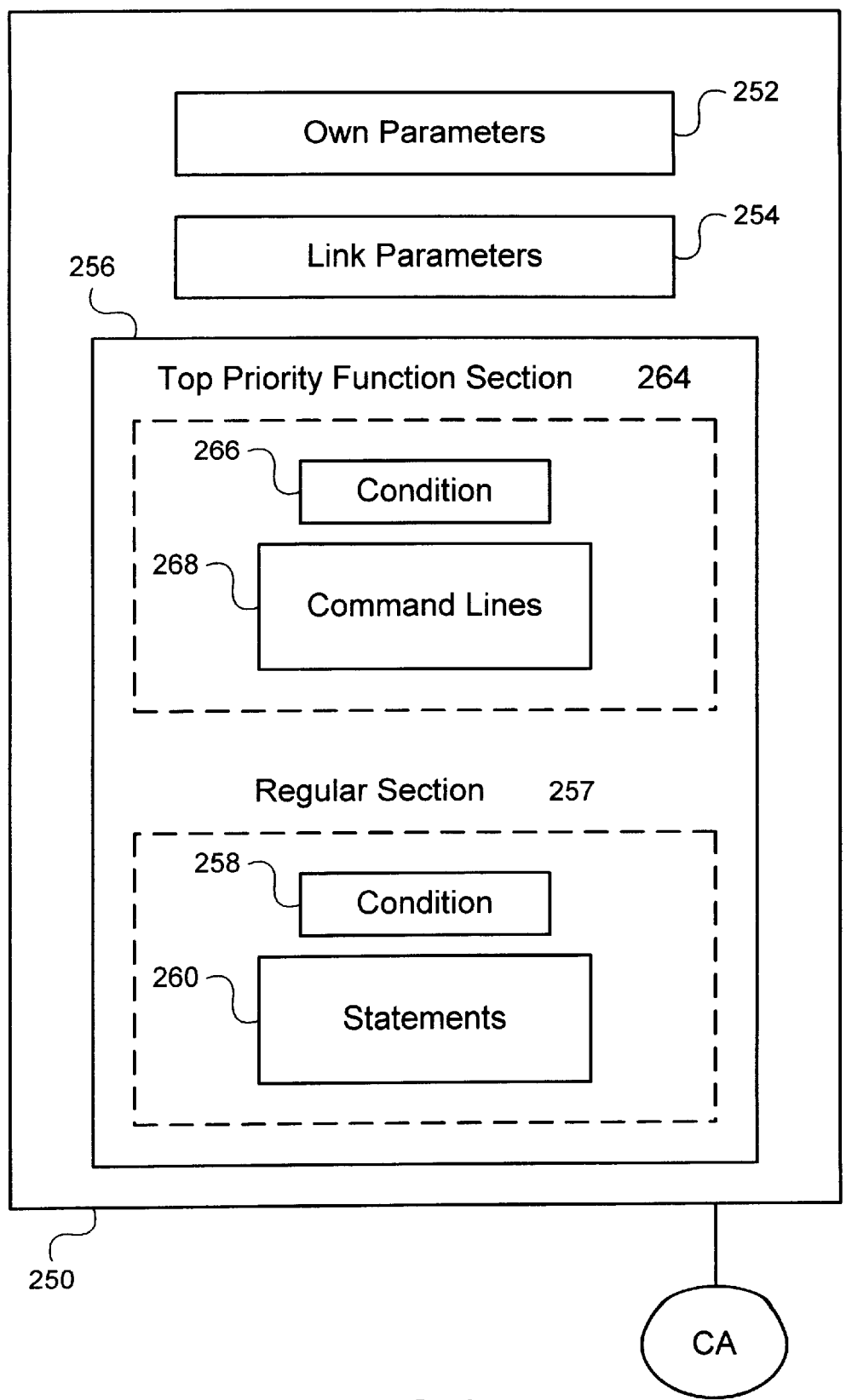
FIG. 9 shows a block diagram of the structure of a DNA file in accordance with the present invention.

FIG. 9 is a block diagram showing the logic structure of a DNA file 250 associated with a cell, such as cell CA. File 250 has a section 252 containing parameters ("own parameters") related to the characteristics of cell CA itself For example, section 252 may contain parameters related to the way cell CA manifest itself when invoked: the window size and background color of cell CA, the name of cell CA, the names of audio files associated with its invocation and termination, etc.

File 250 also contains a section 254 containing linking parameters ("link parameters") on cells related to cell CA. Examples of the parameters contained in this section are: the names, symbols and positions of the other cells. One of the parameter is "close," which is interpreted as closing cell CA when the cell associated with this parameter is invoked.

File 250 further contains a DSF information section 256. This section contains a regular statements section 257 and a top priority function section 264. The structure of the regular section 257 and top priority function section 264 are substantially the same, except that top priority function section 264 has a higher priority in statement execution. These two sections contain individual headers for identifying the sections (e.g., each section headed by a different name or symbol).

Regular section 257 contains a "condition" section 258 and a statements section 260. Statements section 260 comprises DSF statements sent to cell CA by other cells. Statements in statements section 260 are executed sequentially. Examples of statements are "Draw Circle, " "Draw Line," and "Scrolling." Each statement also contains parameters necessary for the execution of the statement (e.g., location and diameter of circles). Condition section 258 comprises three components: (a) a first pointer to the last DSF statement currently existing in statements section 260, (ii) a second pointer to the current DSF statement being processed by cell CA, and (iii) the current status of the cell. Examples of status are: ready, busy, lock, and never.

Top priority function section 264 contains a condition section 266 and a command lines section 268. The structure of condition section 266 is similar to the structure of condition section 258 (e.g., both sections contain two pointers). Command lines section 268 contains executable command lines which are sent by other cells using DSF (or similar) protocol. The command lines have a higher execution priority than the statements in statements section 260 (the details of execution priority will be discussed below in connection with FIG. 10). The command lines in command lines section 268 are executed sequentially. Examples of commands in section 268 are close, min (for minimizing a window), max (for maximizing a window), restore, etc.

It should be appreciated that the logic structure shown in FIG. 9 can be implemented using one or more physical files. Further, portions of the logical sections may intermingle physically. In one embodiment of the present architecture, the DNA file is a text file. Thus, the content of the DNA file can be modified by using a regular text editor.

Statements sent by one cell to another follow the DSF protocol. A sending cell (e.g., cell CS) sets up a communication link with the DNA file 250 associated with cell CA. Specifically, it looks up the address of DNA file 250 and determines whether DNA file 250 is able to accept DSF statements (e.g., at a "ready" state) by examining its status in condition section 258. Statements will be issued by cell CS only when cell CA is ready to accept them. In one embodiment, the issuance of statements involves writing ASCII characters (e.g., the ASCII characters for "Draw Circle") to statements section 260 of DNA file 250.

When cell CS is authorized to issue statements to cell CA, cell CS reads the first pointer (in condition section 258) to the last DSF statement to determine the appropriate address to write the DSF statements. It is important not to overwrite DSF statements already existed in cell CA. Cell CS writes DSF statements to statements section 260 of DNA file 250. Cell CS also updates the first pointer in condition section 258 so as to point to the last DSF statement newly written into statements section 260. The communication link between cells CA and CA is terminated. It can be seen that cell CA and DNA file 250 do not maintain record (i.e., history) indicated that these new statements originate from cell CS.

It should be appreciated that the above described DSF protocol is only an exemplary protocol. Other protocol could be used to write DSF statements to cells. For example, different pointer structures can be used, e.g., the first pointer can point to the position after the last DSF statement. Different types of status and different ways for checking status information can be used. Further, the statements could be stored in accordance with a logic structure instead of stored physically in a sequential manner. For example, the statements could be organized into groups with the address of each group pointed to by a pointer.

Command lines are sent by one cell to another using a protocol substantially the same as the DSF protocol. Because regular statements section 257 and top priority function section 264 have different headers, the sending cell can distinguish between these two sections and write to the appropriate section. Other means for identifying these two section cam also be used (e.g., maintaining separate linked lists of statements and command lines).

Because DSF statements/commands are executed sequentially (either physically or logically), cell CA needs to complete execution of statements/commands (if any) preceding the above mentioned statements/commands written by cell CS. This set of previously written statements/commands are likely to be written by other cells (although it is also possible that it is written by cell CS in a prior communication link).

After the set of previously written statements/commands has been executed and prior to the execution of the statements/commands written by cell CS, cell CA does not have to take any action with respect to the cell which wrote the first set of statements/commands (e.g., no "return" is needed). This aspect of the present architecture is different from conventional programming architecture.

Note that the communication link between cells CA and CS can be terminated prior to the execution of the first statement/command sent by cell CS (for example, the previously written DSF statements/commands have not yet be executed completely when cell CS finishes sending DSF statements to cell CA). This is different from conventional linking in which communication link between two program modules is completed only after the task relating to these two modules is executed completely.

In a different embodiment of top priority function section 264, command lines section 268 allows only one command. In this embodiment, there is no need to have pointers. Thus, condition section 266 can be removed from top priority function section 264. Other cells can write a single command to top priority function section 264 because this section is separated from other sections by a header.

Figure 10:
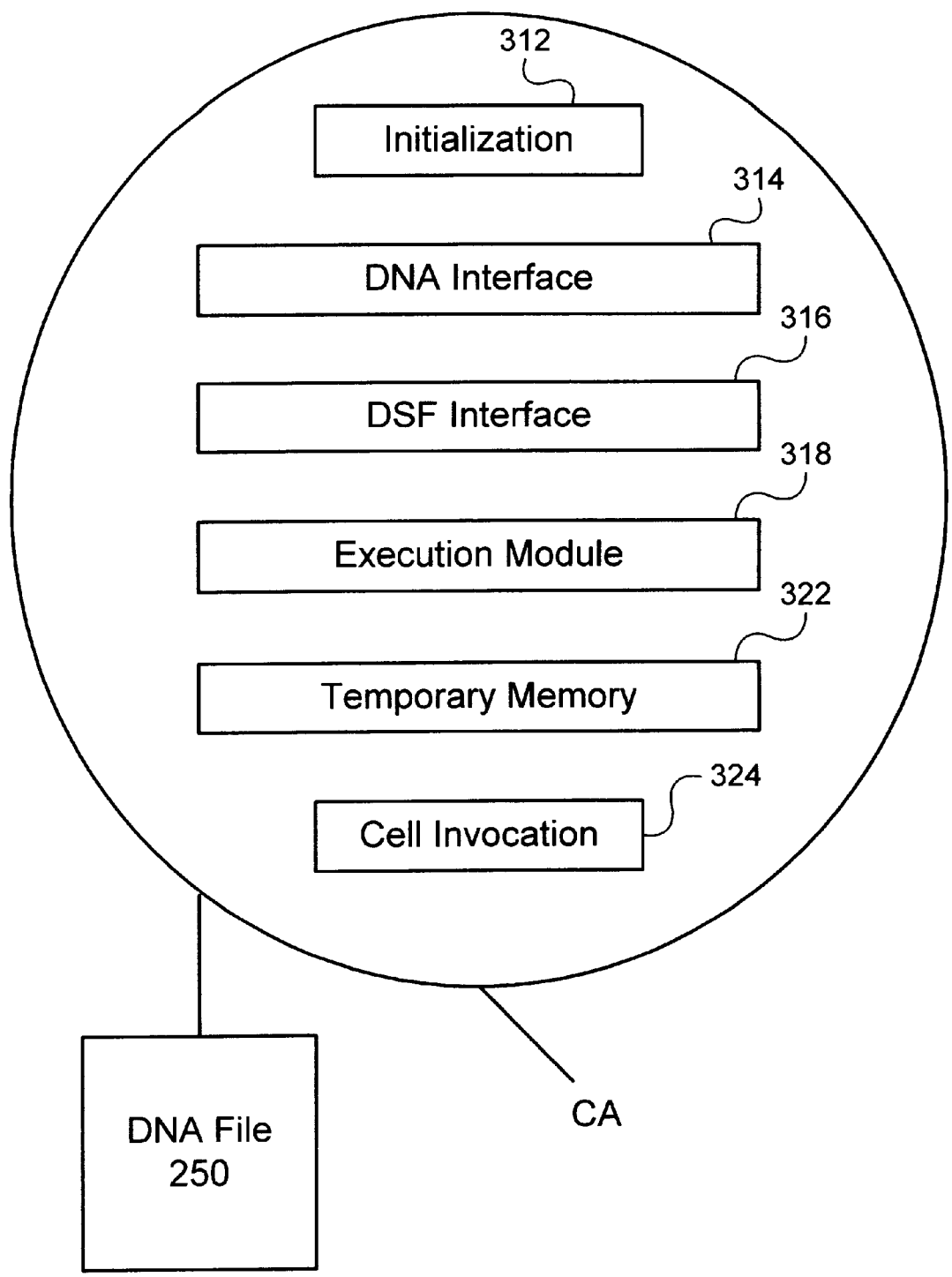
FIG. 10 shows a block diagram of the structure of a cell in accordance with the present invention.

FIG. 10 shows the structure of cell CA. It is grouped logically into a plurality of sections, each implemented using instructions executable by a computer. Cell CA contains an initialization section 312 and a DNA interface section 314. DNA interface section 314 allows cell CA to read from and write to its corresponding DNA file 250. Initialization section 312 takes care of housekeeping tasks when invoked, including reading parameters from "own parameters" section 252 of DNA file 250. Cell CA also contains a section 316 for processing DSF protocol. This section contains code (or program instructions) for sending and receiving statements/command lines using the DSF protocol.

Cell CA contains an execution section 318 containing code for automatically executing statements and command lines in DNA file 250 written by other cells. The code sequentially read and execute statements in statements section 260 of DNA file 250. After each statement is executed, cell CA branch to top priority function section 259 and executes all the command lines therein. Cell CA then executes the next statement in statement section 260.

An example is used to illustrate the execution steps. In this example, statements section 260 contains two statements, "Draw Circle" and "Draw line," while the top priority function section 259 contains one command line, "Max". When cell CA reads a "Draw Circle" statement and its associated parameters, the code will perform a graphic algorithm for drawing a circle at an appropriate place with an assigned diameter (as determined by the associated parameters). Cell CA then branches to top priority function section 259 and executes the "Max" command, which causes a window associated with cell CA to enlarge. Cell CA returns to statements section 260 and executes the next statement, i.e., the "Draw Line" statement. Cell CA executes a graphic algorithm which draws a line in accordance with the parameters associated with the "Draw Line" statement.

In the above example, if the command line in top priority function section 259 contains a "Close" command, cell CA will close itself. In this situation, the "Draw Line" statement will not be executed.

In one embodiment of the present architecture, cell CA reads statements section 260 at predetermined times regardless whether statements are present in DNA file 250 (i.e., similar to a polling arrangement). In another embodiment of the present architecture, a cell sends a signal to cell CA, either directly or indirectly (e.g., through an operating system), after sending statements to DNA file 250. Upon receiving the signal, cell CA executes the statements in statements section 260 until all the statements have been executed. Cell CA then waits for another signal. This embodiment is similar to an interrupt arrangement. Thus, the execution of statements is carried out automatically in both embodiments.

Cell CA contains a temporary memory section 322 for storing temporary information. As an example, it is possible to change attributes (e.g., background color and the size of the display window) of cell CA during its execution. In one embodiment of the present architecture, the changed attributes are temporarily stored in temporary memory section 322 instead of immediately being written to DNA file 250. In this embodiment of cell CA, the attribute information stored in temporary memory section 322 is written into "own parameters" section 252 of DNA file 250 only when cell CA is terminated.

Cell CA also contains a cell invocation section 324 for invoking other cells. In one embodiment of the present architecture, this section obtains information about the cell desired to be invoked and pass this information to a specialized cell which actually invoke the desired cell. It is also possible to incorporate the functionality of this specialized cell in the cell invocation section of cell CA and other cells.

It should be appreciated that the above mentioned sections in cell CA are grouped logically, and portions of these sections could intermingle physically.

It can be seen from the above described structures of cell CA and its associated DNA file 250 that both cell CA and DNA file 250 do not keep track of the origin of the DSF statements. A cell may accept DSF statements (stored in its associated DNA file) from many cells. After the DSF statements have been received, the linkage between the originating and destination cells is terminated. The cell executes DSF statements contained in its associated DNA file without knowledge of how the statements arrive the DNA file. As a result, there is no need to "return" to any cell.

Typically, the size of each cell is small and the function of the cell well defined. Consequently, the execution speed is fast. As a result of the small size and specialized function, the cells can be easily written to fully utilize the resources of a computer. The communication between cells using DSF is direct, with minimum amount of access to the operating system on which an application is run. As a result, the efficiency is high.

The present architecture comprises at least two cells which can communicate with each other. The cells are encapsulated program modules that are specialized for their designed tasks. Therefore, applications developed using the present architecture comprise of multiple executables which can run independently or concurrently. The cells interact with each other using the inventive DSF protocol. Each cell can control the action of other cells. For example, a first cell can control a second cell, and the second cell can control the first cell. Therefore, no single cell has complete control over the other cells, or in other words, there is no boss. On the other hand, under conventional architectures, program modules subordinate to a boss cannot control the boss. Another unique characteristic of the present architecture is that the cell that receives a command does not keep any information of where the command came from. This lack of historical knowledge allows cells to move forward instead of going backward in a link.

The technology of the present system is called the "digital cell technology" because the structure of program modules and the interaction between them are similar to biological cells. Some of the similarities are listed here: (i) an application is made up of many cells dynamically interacting with each other, (ii) many cells can be active at a time, (iii) the interaction of a pair of cells can be independent of interaction of other pairs of cells, (iv) control is distributed instead of centralized, and (v) each cell is associated with a DNA structure which guides the behavior of the cell.

One of the embodiments of the present architecture is a multimedia application development system which runs under Microsoft's MS Windows. In this environment, cells are programs stored as "EXE" files and typically show a window on a computer monitor when invoked. By linking these cells, a user can construct an application software just like assembling blocks. Each cell, with its specific function, is given another function or value through DSF protocol with other cells to produce a variety of applications.

Figure 11:
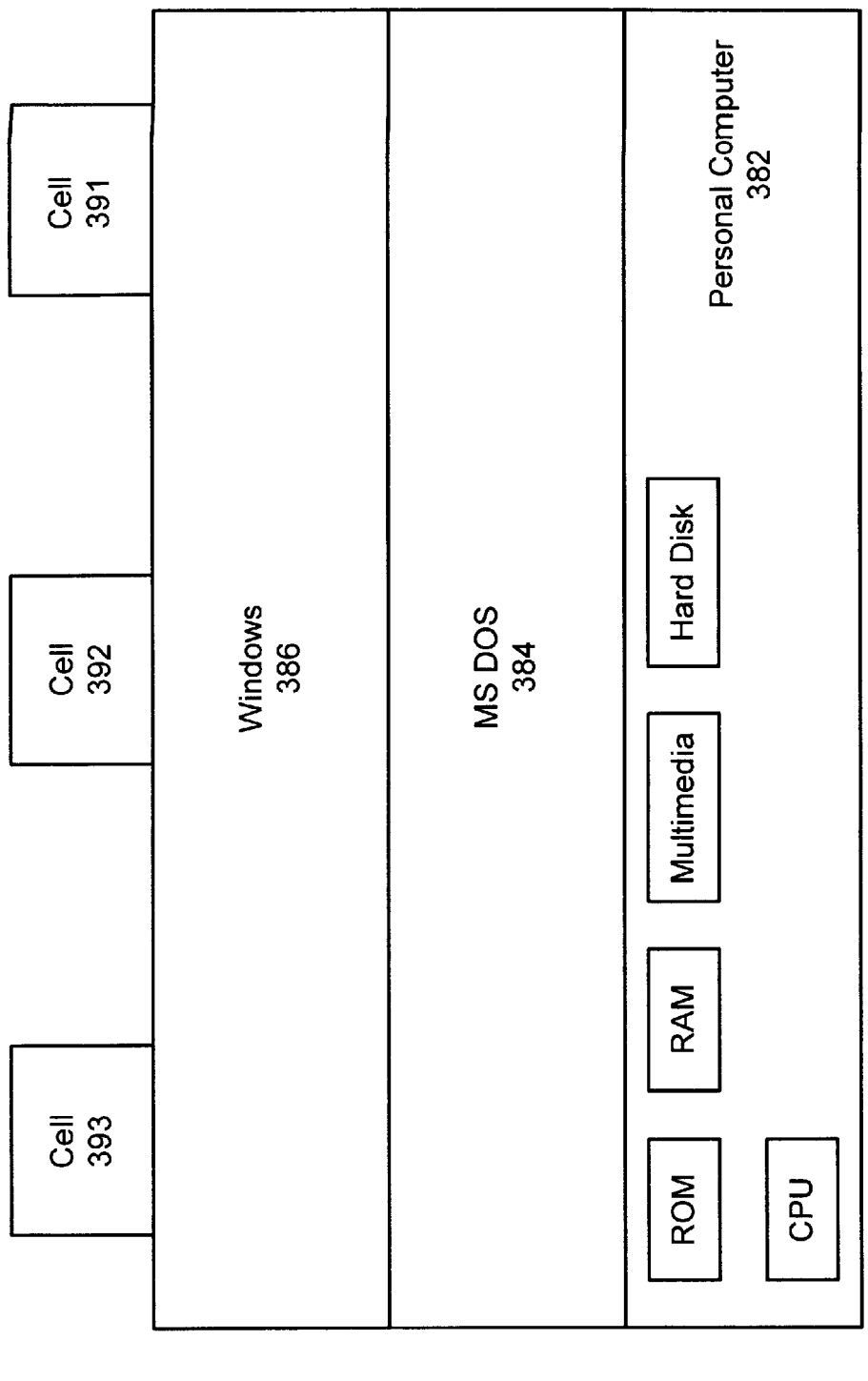
FIG. 11 is a block diagram of a computer system running an application in accordance with the present invention.

FIG. 11 shows a block diagram of a computer system 380 running the above described application development system. Computer system 380 comprises a personal computer 382, such as an IBM compatible computer. Personal computer contains components such as a CPU, RAM, ROM, hard disk and multimedia device (e.g., sound card, CD-ROM reader, video card, etc.). Personal computer is loaded with a MS-DOS 384 and a MS Windows 386. Cells 391–393 of the present architecture run on top of MS Windows 386. Some of these cells can be graphically displayed on a display device and played on a sound card of personal computer 382.

An exemplary list of cells which run under MS Windows environment together with a description of their functions is given below:

NAME DESCRIPTION

BUTTON: Creates buttons with action attributes assigned to them.
VIDEO: Enables video file (AVI) playback.
CONTENTS: Displays text files (TXT) (text editor with ability to adding action attributes to the text).
VISUAL: Enables display of BMP, DXF, TIFF, WRI, and TXT files with dynamic 360-degree free scrolling, multiple layer support, raster and vector overlays, and object overlays with action attributes assigned.
NAKAMA: Enables more than one VISUAL cells to be linked using coordinates. Enables images in two VISUAL cells to be interlocked using an interlinked window (bird's eye view).
RUN: DNA file editor and DNA file executor. Enables continuous reproduction of applications. This cell serves as the specialized cell, mentioned above, for invoking other cells.

COPY: Performs file copying.
TITLE: Executes Title Bar functions.
RESTART: Provides user selection to exit or restart the operating system.
PLAYWAV: Enables sound file (WAV) playback.
AREA: Manipulates the attributes of graphics written in the VISUAL cell.
LIST: Enables objects/layers to be grouped and provides instant access to the defined grouping.

These cells are stored in memory (e.g., floppy and/or hard disk) as ".EXE" files. To effectively allocate system resources for simultaneous activation of more than one cell, the sizes of most cells are around 10 kilobytes. The exception is the VISUAL cell which is about 100 kilobytes.

A simplified example will be used to illustrate the system. Only one type of cell, the visual cell, described above, is used in this example. In this example, the system makes use of the resources of MS Windows. For example, the invocation of a cell (e.g., loading of an appropriate file as a result of clicking on an icon) and the graphic user interface (e.g., the manipulation of windows such as resizing, drag and drop, etc.) are handled by MS Windows.

The multimedia application development system needs to be installed in MS Windows. The installation involves loading files of bitmaps, cells, sound, video, etc. from removable storage media (e.g., floppy, CD-ROM, etc.) to appropriate directories in the hard disk of the computer. Programs are linked to MS Windows and icons are placed at appropriate positions. Thus, a user can invoke the development system by clicking on an icon under MS Windows. Once the development system is running, various cells can be invoked by clicking on icons associated with the cells.

Figure 13:
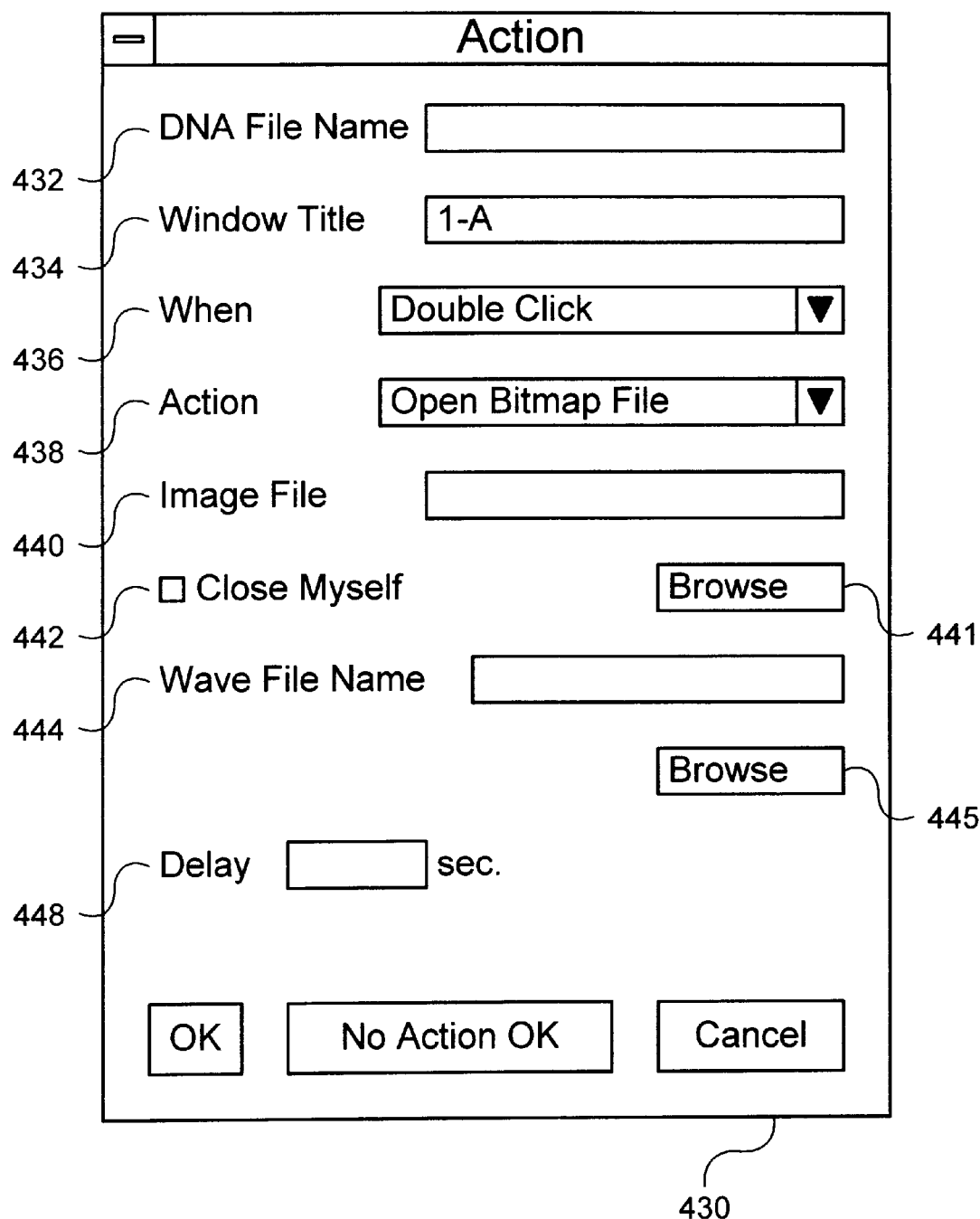
FIG. 13 shows a window for a user to enter information to a DNA file of the present invention.

FIG. 13 shows a window 400 representing a first visual cell displayed on a display screen 402 under the control of MS Windows 386. Window 400 typically contains a graphic image (not shown) and a title bar 404. A user can click on an icon 406 in windows 400, and a side bar 408 is displayed. Side bar 408 contains spaces for displaying icons allowing the user to add functionalities to the first visual cell associated with window 400.

One of the spaces of side bar 408 contains an icon 410 for allowing a user to attach an icon for invoking a second visual cell to window 400. After the user clicks on icon 410, a symbol helps the user to place an icon 412 inside window 400 for representing the second visual cell. A window 430, shown in FIG. 13, then appears which allows the user to define the characteristics of the second visual cell. Side bar 408 also contains an icon 424 which allows the user to delete a visual cell placed inside window 400.

Window 430 contains a line 432 for the user to enter the name of a DNA file associated with the second visual cell. The information entered in window 430 will be stored in this DNA file. Window 430 also contains a line for the user to enter the title of a graphic window showing the second visual cell. In FIG. 13, the title "1-A" is entered in line 434. A line 436 allows the user to select the mode of invoking the second visual cell. In window 430, "double click" is selected, indicating the second visual cell is invoked upon double clicking on icon 412.

Window 430 contains a line 438 allowing the user to define the action of the second visual cell. In FIG. 13, the action selected is "open bitmap file." Thus, the action performed by the second visual cell is to open a bitmap file. A line 440 allows the user to enter an image file to be opened when the second visual cell performs its action. Window 430 contains a "browse" button 441 so as to allow the user to search for image files already stored in the computer for the purpose of entering an appropriate file in line 440. Window 430 also contains a "close myself" box 442. When selected, the first visual cell will be closed automatically when the second visual cell is invoked. This is implemented by attaching a "close" parameter to a line in the linking parameter of the DNA file associated with the first visual cell which links the first and the second visual cells.

In this embodiment, lines 440–442 are associated with the action line 438. If the action selected is "close visual cell" instead of "open bitmap file," lines 440 would be changed to allow the user to enter the DNA file of a visual cell selected to be closed after invocation of the second visual cell. In this embodiment, the second visual cell sends a "quit" DSF statement to the designated visual cell after invocation for the purpose of closing that cell.

It is possible to use window 430 to input a variety of actions to be performed by the second visual cell. The two examples above are for illustrative purposes only.

Window 430 contains a line 444 which allows the user to enter an audio file associated with the invocation of the second visual cell. Window 430 contains a "browse" button 445 so that the user can search for audio (typically having an extension of "WAV") files already stored in the computer for the purpose of entering an appropriate file in line 444.

Window 430 contains a line 448 allowing the user to enter a delay. This parameter allows the second visual cell to manifest itself a predetermined time interval after icon 412 is clicked on.

It should be appreciated that the format of and information requested by window 430 is exemplary. Depending on the design objective and creativity of a programmer, window 430 could have other formats and request different types of information. When window 430 is closed (after all essential information has been entered by the user), the information contained therein is stored in the DNA file indicated on line 432. In this embodiment, the DNA file is an ASCII text file stored in the hard disk.

When a user clicks on icon 412, a window 416 is opened to represent one instance of the second visual cell. Window 416 has characteristics defined by its associated DNA file. For example, window 416 contains the title "1-A" (as determined from line 434 of window 430) and a graphic image 417 associated with the image file defined in line 440. The position of window 416 can be moved around using normal MS Windows methods (i.e., drag and drop). When a user clicks on icon 412 again, another window 418 of the second visual cell appears simultaneously with window 416. In this case, two copies of the second visual cell are loaded into the RAM, each is associated with the same DNA file.

Figure 12:
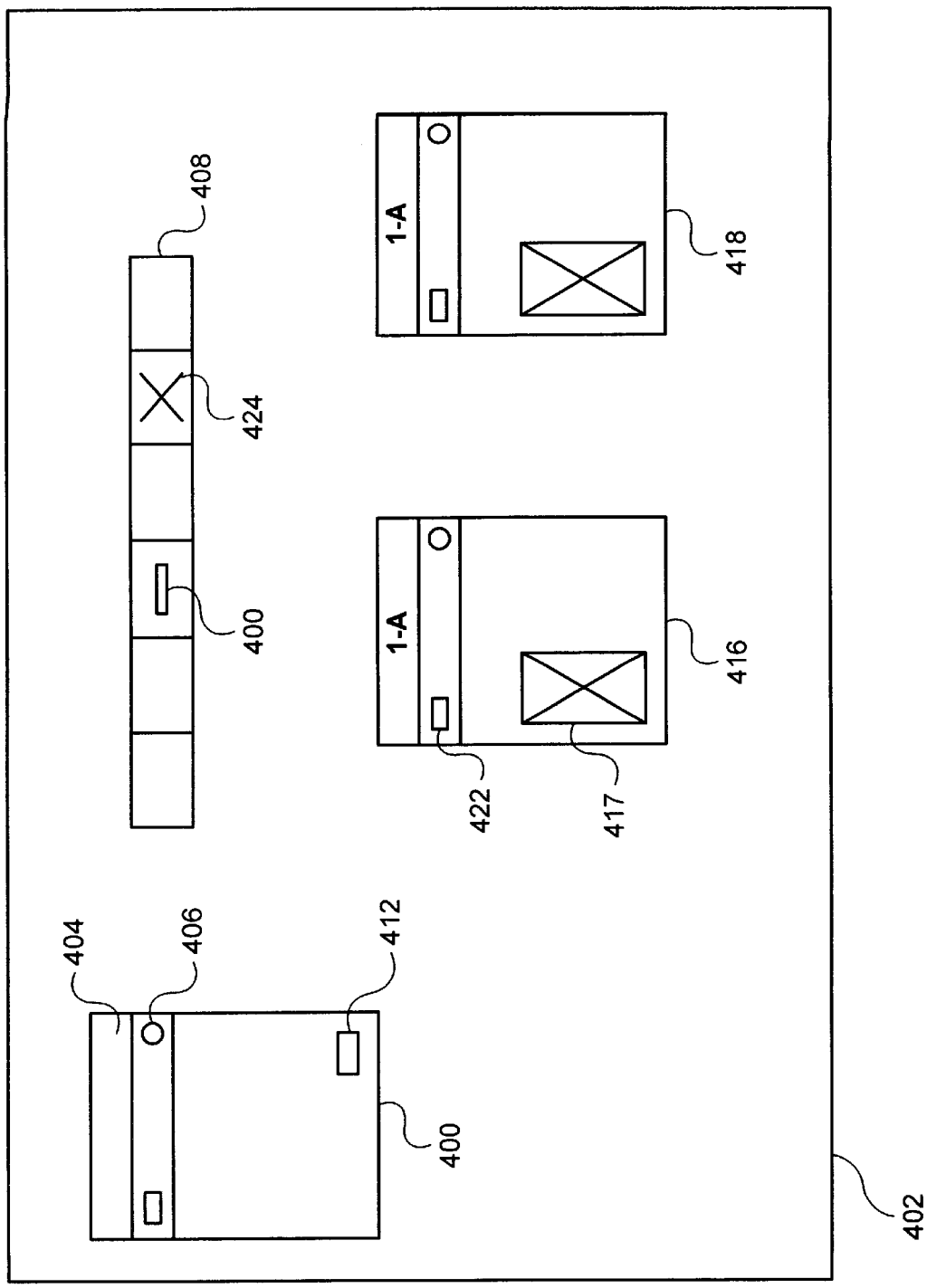
FIG. 12 shows various windows associated with visual cells during the execution of a multimedia development system in accordance with the present invention.

It is possible to terminate the first visual cell while the second visual cell is active. In FIG. 12, each visual cell window has a "close" button, such as button 422 in window 416, for allowing the user to close the window. In the development system shown in FIG. 12, the user can close window 400 associated with the first visual cell while windows 416 and 418 continue to be active on display screen 402.

It is also possible to close window 400 using a statement issue by the second visual cell. As explained before, line 438 of FIG. 13 can be set to "close visual cell" and the name of the visual cell is set to the first visual cell. When the second visual cell is invoked, it will send a DSF statement to the DNA file associated with the first visual cell for the purpose of closing the first visual cell.

Figure 14:
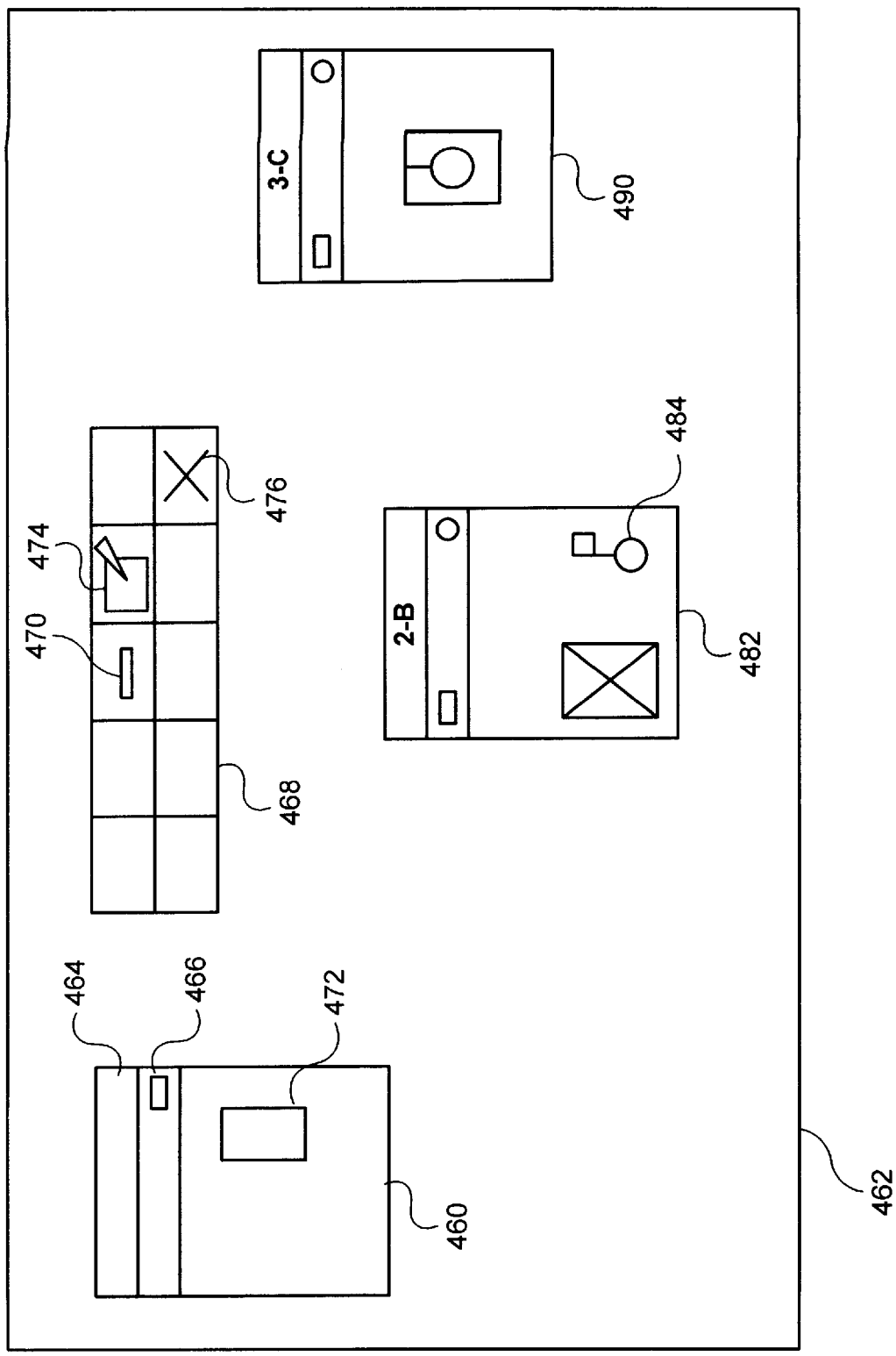
FIG. 14 shows various windows associated with a button cell and visual cells during the execution of a multimedia development system in accordance with the present invention.

An example showing two cells of different types, a visual cell and a button cell, is described below. FIG. 14 shows a window 460 representing a button cell displayed on a display screen 462 under the control of MS Windows 386 of FIG. 11. Window 460 contains a title bar 464. A user can click on an icon 466 in window 460 and a side window 468 is displayed. Side window 468 contains spaces for displaying icons allowing the user to add buttons to, and remove buttons from, window 460.

One of the spaces of side window 468 contains an icon 470 for allowing a user to attach a button to window 460. After the user clicks on icon 470 in side window 468, a symbol appears to help the user to place a button 472 at a desired position inside window 460. This new button can later be clicked on by the user and a sequence of user-defined activities will occur. Side window 468 also contains an icon 476 which allows the user to remove an existing button inside window 460.

Figure 15:
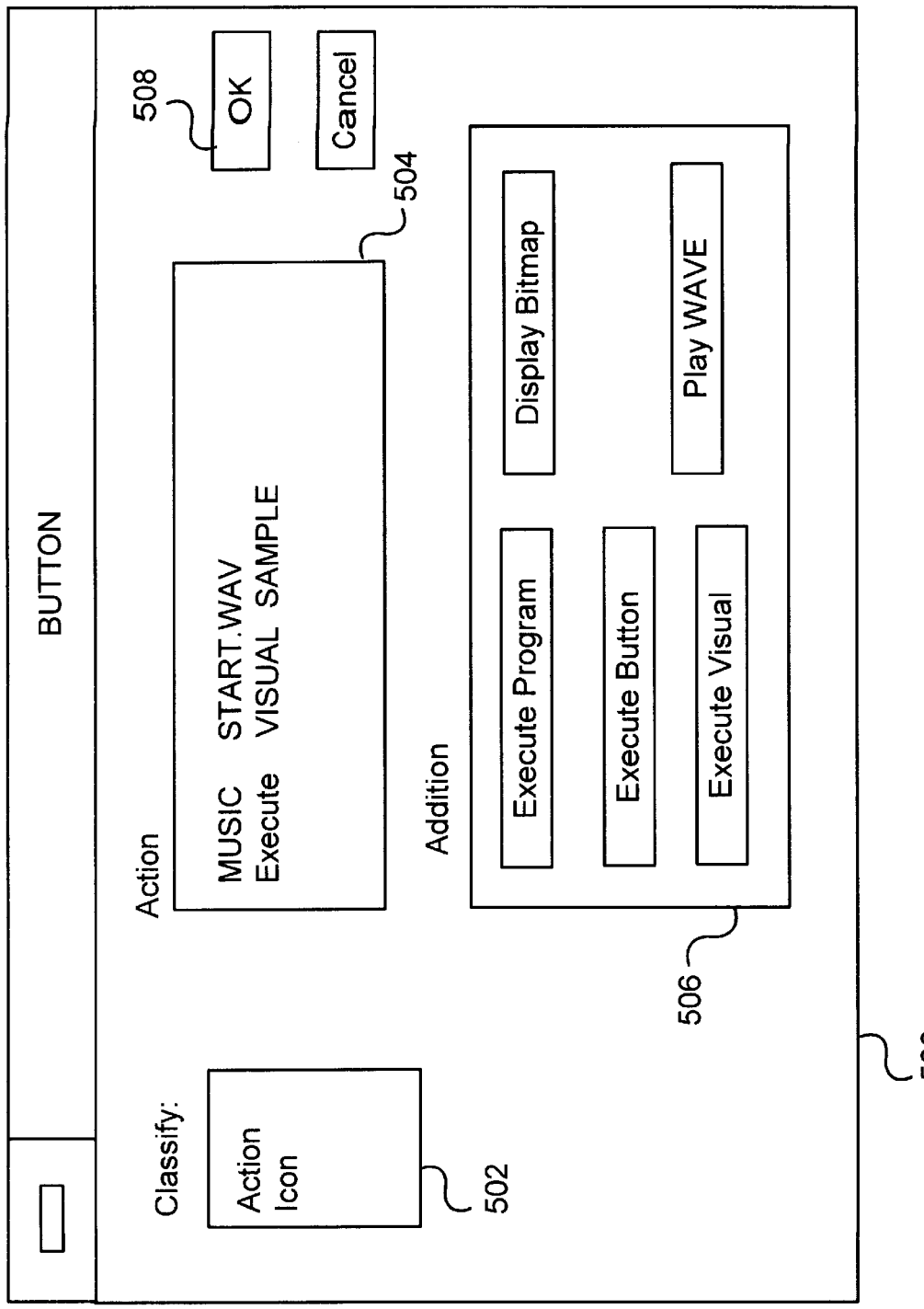
FIG. 15 is a window showing the format for a user to specify a button in accordance with the present invention.

The user can then click on another icon 474 in side window 468 which opens a windows 500, shown in FIG. 15, allowing the user to define the characteristics of button 472. Window 500 contains an area 502 showing a list of items for allowing the user to select the types of information to be entered into window 500. For example, selection of "action" allows the user to enter the actions to be taken by button 472 when it is invoked while selection of "icon" allows the user to choose an icon to represent the button cell instead of using a simple rectangular button. The list may contain other items. Depending on the choice of item in the list, the appearance of, and information requested by, window 500 will be different.

In list 502, "action" is selected. As a result of such choice, an "action" window 504 and "addition" window 506 are displayed. Action window 504 shows the actions of button 472 when invoked. The content of action window 504 is selected by user using addition window 506.

Figure 16:
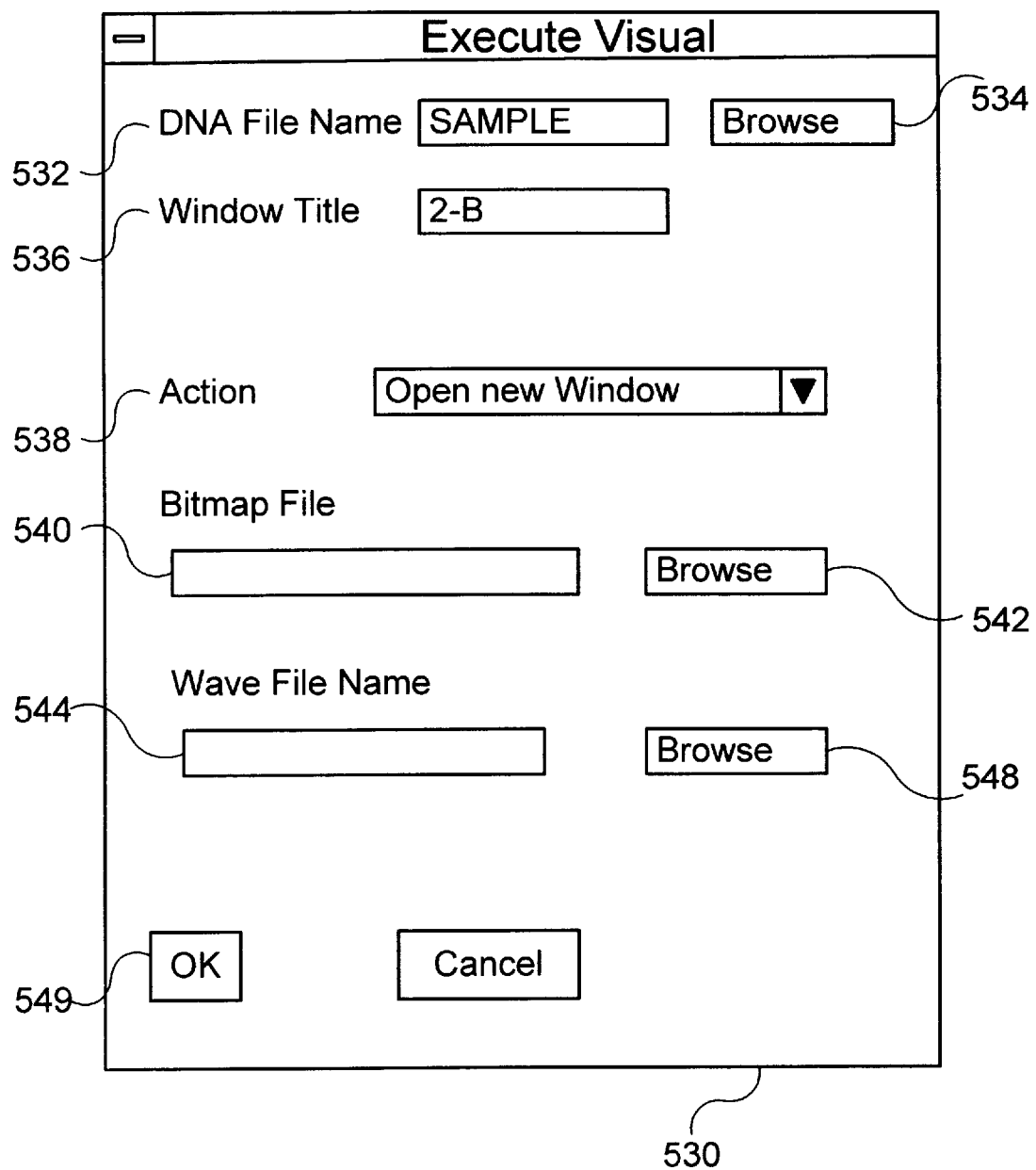
FIG. 16 is a window showing the format for a user to specify a visual cell associated with a button cell in accordance with the present invention.

Addition window 506 contains a plurality of actions, such as "execute program," "execute button," "execute visual," "play wave," and "display bitmap." The user can click on any one of these actions and a window for allowing the user to further define the action will be displayed. An example of such a window for "execute visual" is shown in FIG. 16. The user can select one or more actions in addition window 506.

The selected action is displayed on action window 504. For example, action window 504 contains a line "MUSIC START.WAV" indicating that the "play wave" action in addition window 506 has previously been selected. A window associated with "play wave" (not shown) allows the user to indicate that an audio file named "START.WAV" should be played. Action window 504 also contains a line "EXECUTE VISUAL SAMPLE" indicating that the "execute visual" action in addition window 506 has previously been selection. When the user clicks on an "OK" button 508, the information entered in window 500 is stored in a DNA file associated with this button cell.

The specification of visual cell SAMPLE is now described. A window 530 of FIG. 16 shows the type of information requested upon selecting the "execute visual" action of addition window 506. Window 530 contains a line 532 for the user to enter the DNA file of the visual cell desired to be invoked. In this case, the name is "SAMPLE" which corresponds to the "Execute VISUAL" line in action window 504. Window 530 contains a "browse" button 534 in case the user needs to find a list of preexisting DNA filename. Window 530 also contains a line 536 for the user to enter the title of the visual cell window. In this case, the title is "2-B." Window 530 contains a line 538 for allowing the user to enter the action desired. Examples of actions are "open new window," "open new vector," "open new movie," etc. The content of the next line in window 530, line 540, depends on the selection in line 538. In this example, line 540 allows the user to enter the name of a bitmap file because the action in line 538 is "open new window." If the action in line 538 is "open new vector" or "open new movie," line 540 will request the name of a vector file or a video file, respectively. Window 530 contains a "browse" button 542 allowing the user to find a desired preexisting bitmap file. Window 530 contains a line 544 allowing the user to enter an audio file when the visual cell is invoked. Window 530 contains a "browse" button 548 allowing the user to select a desired preexisting WAV file. When the user clicks on an "OK" button 549, the information entered in window 530 will be used to specify the selected visual cell associated with button 472. This information, along with the rest of the information entered in window 500, will later be stored in the DNA file of button 472.

When all the information relating to button 472 has been entered and stored, button 472 can be invoked. Returning now to FIG. 14, side window 468 can be removed by clicking on icon 466. Removing side window 468 changes window 460 from an edit mode (for allowing users to add, modify and remove buttons) to an active mode (for allowing users to invoke buttons in window 460). In this embodiment, button 466 acts as a toggle for displaying and removing side window 468. After side window 468 is removed, the user can click on button 472 to invoke its associated actions: play a piece of music and display a window 482 corresponding to visual cell SAMPLE. The title of SAMPLE's window is "2-B", which corresponds to line 536 of FIG. 16. In this example, window 482 contains an icon 484 which allows another visual cell to be invoked. This icon 484 has been previously placed in visual cell SAMPLE in a manner similar to the operation discussed above in connection with FIG. 12. The user can click on icon 484 to display another window 490 corresponding to a different visual cell.

It should be appreciated that the format of and information requested by windows 500 and 530 is exemplary. Depending on the design objective and creativity of a programmer, windows 500 and 530 could have other formats and request different types of information.

Another example of an application running under the system of FIG. 11 is a hotel index system displayed on the screen of a computer. The application can be formed by assembling a collection of cells. Any of the cells can be invoked first. For example, a user of the application can invoke (e.g. by clicking on) a cell which is designed to show a window containing the index. Another cell becomes active when a user clicks on an item in the index window. This new cell display itself as another window that shows a regional map. The user can click on an item on the map window to activate a third cell, which includes text or pictures in its display. In this way, more than one cell is active simultaneously, creating an application program.

Figure 17:
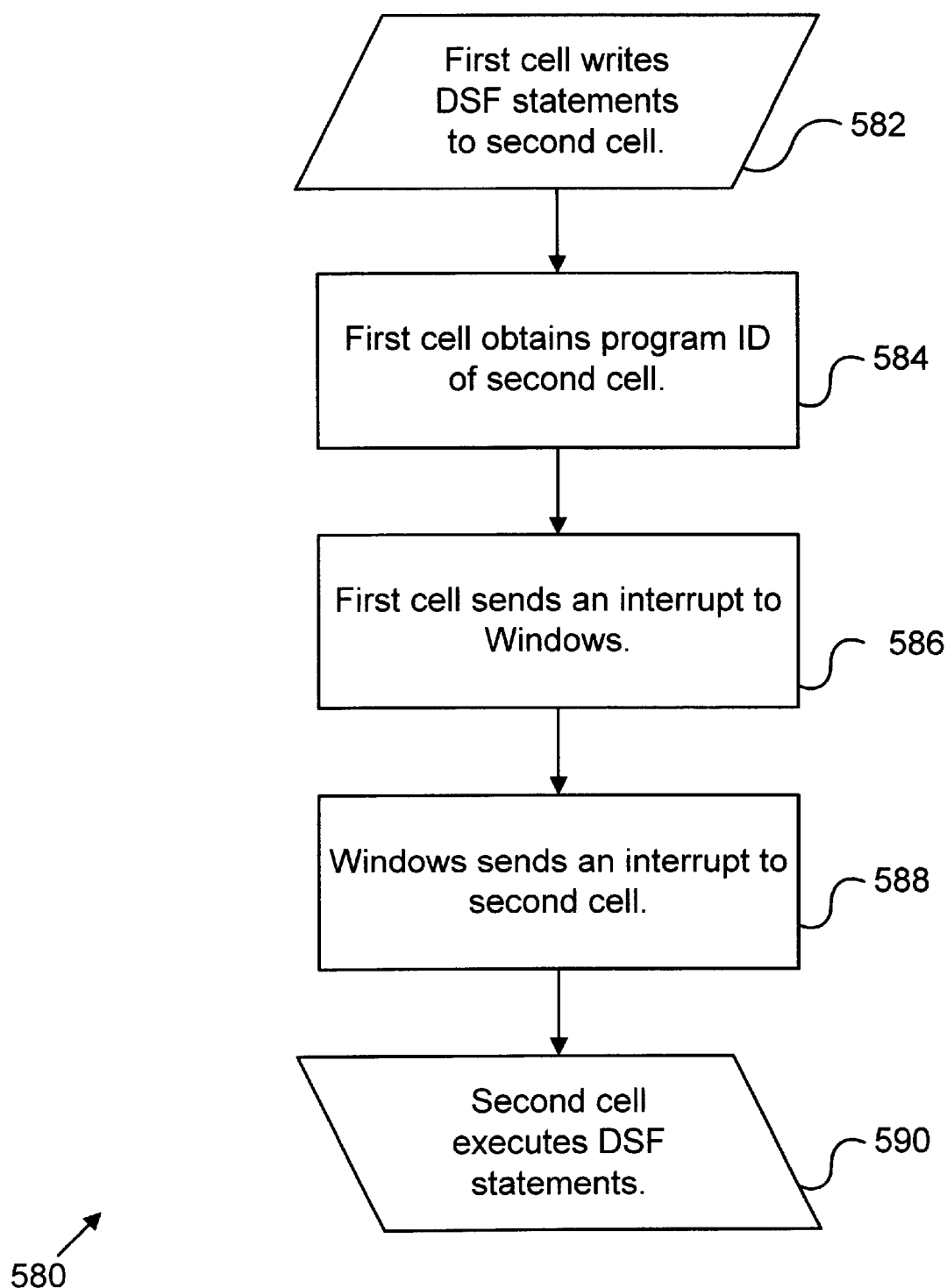
FIG. 17 is a flow chart showing a cell notification procedure in accordance with the present invention.

As mentioned above, in one embodiment of the present architecture, a cell can indirectly notify another cell after writing DSF statements thereto. FIG. 17 is a flow chart 580 showing an embodiment of indirect notification of cells. In this example, MS Windows 386 of FIG. 11 assigns a program identification to each program (including the cells) running on it. After a first cell writes a set of DSF statements to a DSF file of a second cell (step 582), it obtains the program identification of the second cell (step 584). The first cell sends an interrupt to MS Windows 386 requesting it to send an interrupt to the second cell (step 586). In response to this request, MS Windows 386 sends an interrupt to the second cell (step 588). The second cell then executes the DSF statement previously written to its associated DNA file (step 590).

It should be appreciated that the MS Windows in the above flow chart is merely an example of an operating system. Other operating systems, such as MS DOS and Macintosh OS, can be used to perform the interrupt in place of MS Windows.

We claim:

1. A method for managing communication of object oriented programming classes, comprising the steps of:

provided a first object oriented programming class for managing communication, said first class containing a first parameter file;

providing a plurality of object oriented programming classes, wherein each one of said plurality of classes communicates only with said first class and cannot communicate with other members of said plurality of classes, each of said plurality of classes containing a parameter file;

said first class containing means for sending a first command to said parameter file of each of said plurality of classes;

each of said plurality of classes containing means for sending a second command to said first parameter file;

said first class containing means for executing said second command without returning result of execution to members of said plurality of classes that have previously sent said second command;

each of said plurality of classes containing means for executing said first command without returning result of execution to said first class;

sending by at least a first member of said plurality of classes a first message to said first class; and delivering by said first class to at least a second member of said plurality of classes a second message related to said first message.

2. The method of claim 1 wherein said first and said second messages are coded in ASCII format.

3. The method of claim 1 wherein said first message contains an indication of an address of a destination class and an instruction to said destination class, said destination class being a member of said plurality of classes.

4. The method of claim 1 further comprising the step of sending by said first member of said plurality of classes a registration message to said first class prior to sending said first message.

5. The method of claim 4 further comprising the step of sending by said first member of said plurality of classes a deactivation message to said first class when said first member of said plurality of classes is deactivated.

6. The method of claim 3 further comprising the step of constructing a list of instructions and their associated destinations, and wherein said delivering step includes a step of searching for said list to determine destination of an instruction in said first message.

7. The method of claim 1 wherein members of said plurality of classes may reside in more than one computers, and wherein at least one of said first and said second messages is transmitted via a data network.

8. A system for managing communication of object oriented programming classes, comprising:

a first object oriented programming class for managing communication, said first class containing a first parameter file;

a plurality of object oriented programming classes, each one of said plurality of classes capable of sending messages only to said first class and cannot send messages to other members of said plurality of classes, each of said plurality of classes containing a parameter file;

said first class containing means for sending a first command to said parameter file of each of said plurality of classes;

each of said plurality of classes containing means for sending a second command to said first parameter file;

said first class containing means for executing said second command without returning result of execution to members of said plurality of classes that have previously sent said second command;

each of said plurality of classes containing means for executing said first command without returning result of execution to said first class; and said first class containing means for sending a second message to a second member of said plurality of classes in response to a first message sent by a first member of said plurality of classes.

9. The system of claim 8 wherein said first and said second messages are coded in ASCII format.

10. The system of claim 8 wherein said first message contains an indication of an address of a destination class and an instruction to said destination class, said destination class being a member of said plurality of classes.

11. The system of claim 10 wherein said first class further comprises:

means for receiving a registration message sent by at least a member of said plurality of classes;

means for storing information of members of said plurality of classes that have been activated;

means for storing a list of instructions and their associated destinations; and means for receiving deactivation messages send by at least a member of said plurality of classes.

12. The system of claim 8 wherein said plurality of classes may reside in more than one computers.

\* \* \* \* \*